(12) United States Patent
Tamaoki et al.

(10) Patent No.: US 10,350,495 B2
(45) Date of Patent: Jul. 16, 2019

(54) SIMULATION CONTROL DEVICE AND INFORMATION STORAGE MEDIUM

(71) Applicant: BANDAI NAMCO ENTERTAINMENT INC., Tokyo (JP)

(72) Inventors: Jun Tamaoki, Tokyo (JP); Akio Onda, Warabi (JP); Haruyoshi Yamamoto, Tokyo (JP)

(73) Assignee: BANDAI NAMCO ENTERTAINMENT INC., Tokyo (JP)

( * ) Notice: Subject to any disclaimer, the term of this patent is extended or adjusted under 35 U.S.C. 154(b) by 75 days.

(21) Appl. No.: 15/470,136

(22) Filed: Mar. 27, 2017

(65) Prior Publication Data

US 2017/0274283 A1 Sep. 28, 2017

(30) Foreign Application Priority Data

Mar. 28, 2016 (JP) .................................. 2016-064750

(51) Int. Cl.
| | | |
|---|---|---|
| *G06F 3/01* | (2006.01) | |
| *A63F 13/53* | (2014.01) | |
| *A63F 13/213* | (2014.01) | |
| *A63F 13/235* | (2014.01) | |
| *A63F 13/25* | (2014.01) | |

(Continued)

(52) U.S. Cl.
CPC ............ *A63F 13/53* (2014.09); *A63F 13/213* (2014.09); *A63F 13/235* (2014.09); *A63F 13/25* (2014.09); *A63F 13/426* (2014.09); *A63F 13/52* (2014.09); *A63F 13/80* (2014.09); *G06F 3/011* (2013.01); *G06F 3/013* (2013.01); *G06T 13/20* (2013.01); *G06T 19/20* (2013.01)

(58) Field of Classification Search
CPC ...................................................... G07F 17/32
See application file for complete search history.

(56) References Cited

U.S. PATENT DOCUMENTS

| | | | |
|---|---|---|---|
| 9,799,161 B2 * | 10/2017 | Froy .................... | G07F 17/3227 |
| 2004/0229678 A1 * | 11/2004 | Onuki ................. | G07F 17/3211 |
| | | | 463/20 |

(Continued)

FOREIGN PATENT DOCUMENTS

| | | | |
|---|---|---|---|
| JP | 2014-106329 A | 6/2014 | |
| JP | 2015-031703 A | 2/2015 | |

(Continued)

OTHER PUBLICATIONS

U.S. Appl. No. 15/469,987, filed Mar. 27, 2017 in the name of Jun Tamaoki et al.

*Primary Examiner* — Jason Skaarup
(74) *Attorney, Agent, or Firm* — Oliff PLC

(57) ABSTRACT

A simulation control device that utilizes a wearable image display device includes: a display processing section that displays a virtual space on the wearable image display device; a measurement section that measures a gaze time of a user with respect to an object that is placed in the virtual space; a reception section that determines that the object has been selected when a measured value obtained by the measurement has reached a first threshold value, and determines that the selection has been confirmed when the measured value has reached a second threshold value that is larger than the first threshold value; and a notification section that notifies the user of a magnitude of the measured value.

11 Claims, 22 Drawing Sheets

(51) Int. Cl.
*A63F 13/426* (2014.01)
*A63F 13/52* (2014.01)
*A63F 13/80* (2014.01)
*G06T 13/20* (2011.01)
*G06T 19/20* (2011.01)

(56) References Cited

U.S. PATENT DOCUMENTS

| | | | |
|---|---|---|---|
| 2006/0037038 A1* | 2/2006 | Buck | G06F 3/013 |
| | | | 725/9 |
| 2013/0215147 A1* | 8/2013 | Hilkes | G02B 27/017 |
| | | | 345/633 |
| 2015/0035727 A1 | 2/2015 | Kobayashi | |
| 2015/0293745 A1 | 10/2015 | Suzuki et al. | |
| 2016/0066295 A1* | 3/2016 | Han | H04W 68/00 |
| | | | 345/8 |
| 2016/0227107 A1* | 8/2016 | Beaumont | H04N 5/23222 |
| 2016/0274661 A1 | 9/2016 | Maeda | |
| 2016/0321970 A1 | 11/2016 | Kobayashi | |
| 2017/0169649 A1* | 6/2017 | Froy | G07F 17/3223 |
| 2017/0169658 A1* | 6/2017 | Froy | G07F 17/3225 |
| 2017/0169659 A1* | 6/2017 | Froy | G07F 17/3227 |
| 2017/0169662 A1* | 6/2017 | Froy | G07F 17/3206 |
| 2017/0169663 A1* | 6/2017 | Froy | G07F 17/3255 |
| 2017/0169664 A1* | 6/2017 | Froy | G07F 17/3262 |
| 2017/0277260 A1* | 9/2017 | Tamaoki | G02B 27/0093 |

FOREIGN PATENT DOCUMENTS

| | | |
|---|---|---|
| JP | 2015-150063 A | 8/2015 |
| JP | 2015-231443 A | 12/2015 |
| WO | 2014/110302 A1 | 7/2014 |
| WO | 2016/013252 A1 | 1/2016 |

* cited by examiner

SIMULATION CONTROL DEVICE AND INFORMATION STORAGE MEDIUM

Japanese Patent Application No. 2016-064750, filed on Mar. 28, 2016, is hereby incorporated by reference in its entirety.

BACKGROUND OF THE INVENTION

The present invention relates to a simulation control device that utilizes a wearable image display device (e.g., head-mounted display), and an information storage medium.

A head-mounted display (hereinafter referred to as "HMD") is a head-mounted image display device that displays an image in front of the user. For example, JP-A-2015-231443 discloses a game system that links an image to the motion of the head of the player using a motion sensor (acceleration sensor and gyro sensor) provided to the HMD, and a camera that externally captures the HMD, and allows the player to experience virtual reality as if he/she were situated in the game space. The game system disclosed in JP-A-2015-231443 changes the favorable impression parameter of the game character with respect to the player corresponding to the line of sight of the player detected from the motion of the head. of the player so that the player can experience a situation in which the player holds eye contact with the game character.

In recent years, a game that utilizes the motion of a head in addition to an operation performed on a controller provided in the real space has been increasingly developed (e.g., the system disclosed in JP-A-2015-231443). When the game is designed so that the player moves in the real space, it is desirable that the player can keep a hands-free state as much as possible from the viewpoint of safety when the player falls.

SUMMARY

Several aspects of the invention may provide a simulation control device that can implement a user interface with high operability by utilizing a wearable image display device, and a computer-readable non-transitory information storage medium that stores a program that causes a computer to implement a simulation.

According to a first aspect of the invention, there is provided a simulation control device including:

a display processing section that displays a virtual space on a wearable image display device;

a measurement section that measures a gaze time of a user with respect to an object that is placed in the virtual space;

a reception section that determines that the object has been selected when a measured value obtained by the measurement has reached a first threshold value, and determines that the selection has been confirmed when the measured value has reached a second threshold value that is larger than the first threshold value; and a notification section that notifies the user of a magnitude of the measured value.

According to a second aspect of the invention, there is provided a computer-readable non-transitory information storage medium storing a program that causes a computer to implement a simulation, the program being a simulation control program that causes the computer to function as:

a display processing section that displays a virtual space on a wearable image display device;

a measurement section that measures a gaze time of a user with respect to an object that is placed in the virtual space;

a reception section that determines that the object has been selected when a measured value obtained by the measurement has reached a first threshold value, and determines that the selection has been confirmed when the measured value has reached a second threshold value that is larger than the first threshold value; and a notification section that notifies the user of a magnitude of the measured value.

Figure 1:
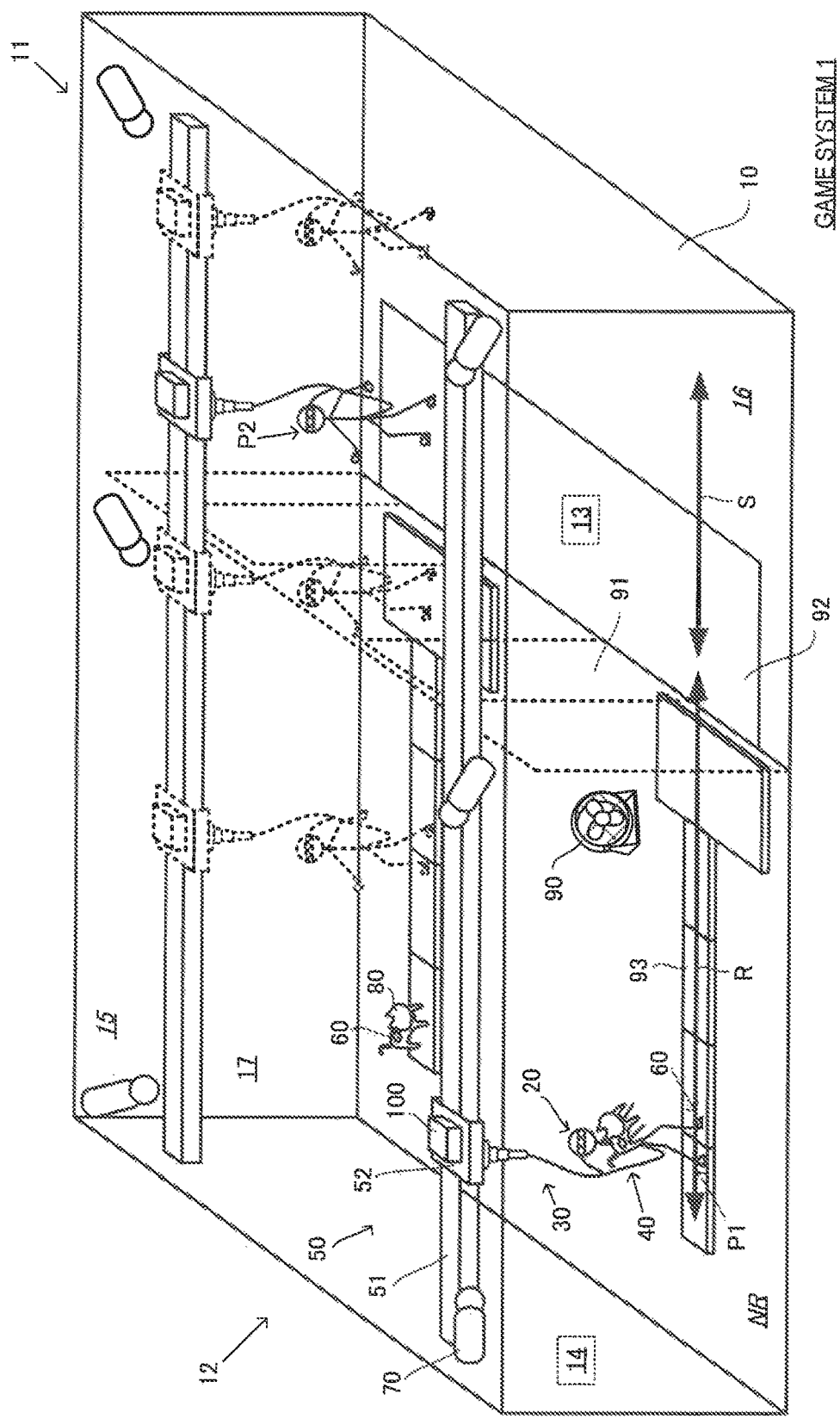
FIG. 1 is a configuration diagram illustrating a schematic configuration of a game system according to one embodiment of the invention.

DETAILED DESCRIPTION OF THE EMBODIMENT (1) According to one embodiment of the invention, there is provided a simulation control device including:

a display processing section that displays a virtual space on a wearable image display device;

a measurement section that measures a gaze time of a user with respect to an object that is placed in the virtual space;

a reception section that determines that the object has been selected when a measured value obtained by the measurement has reached a first threshold value, and determines that the selection has been confirmed when the measured value has reached a second threshold value that is larger than the first threshold value; and a notification section that notifies the user of a magnitude of the measured value.

According to this configuration, the user can select the object by gazing at the object until the measured value exceeds the first threshold value. On the other hand, the user can maintain the object to be in an unselected state by gazing at (glancing) the object so that the measured value does not exceed the first threshold value. After the object has been selected, the user can input an instruction that confirms the selection of the object to the simulation control device by merely gazing at the object until the measured value reaches the second threshold value. Specifically, the user can change the state of the object between an unselected state, a selected state, and a confirmed state, by gazing at the object.

Since the notification section notifies the user of the measured value, the user can determine the object at which the user gazes, and determine whether or not the user is gazing at the desired object. The user can also determine the remaining time until the object is selected, the gaze time required for the selection to be confirmed, and the like based on the measured value (charge amount). Specifically, the simulation control device allows the user to input an instruction by performing a gaze motion (operation).

(2) In the simulation control device, the measurement section may decrease the measured value corresponding to a time in which the user does not gaze at the object when the user has removed his/her gaze from the object, and the reception section may determine that the selection has been canceled when the measured value has decreased to a third threshold value before the selection is confirmed.

According to this configuration, the user can cancel the selection of the object by removing his/her gaze from the selected object for a time equal to or longer than a specific time. Moreover, the selection of the object can be canceled at an earlier timing as the gaze time with respect to the object decreases. On the other hand, the user can increase the time in which the selection of the object is maintained after the user has removed his/her gaze from the selected object by gazing at the selected object for a long time.

(3) In the simulation control device, the measurement section may decrease a speed at which the measured value approaches the third threshold value after the object has been selected, to be lower than a speed at which the measured value approaches the second threshold value.

According to this configuration, the user can easily maintain the selection of the object after the object has been selected without completely maintaining his/her line of sight (i.e., can easily maintain the selection of the object after the object has been selected even when the user has moved or made a motion to some extent).

(4) in the simulation control device, the notification section may provide a visual effect that corresponds to the measured value to the object.

When the measured value is visualized in this manner, the user can determine the object at which the user gazes, and determine whether or not the user is gazing at the desired object. The user can also visually determine the remaining time until the object at which the user gazes is selected, the gaze time required for the selection to be confirmed, and the like.

(5) In the simulation control device, the notification section may distinguish the object that has been selected from the object that is not selected.

According to this configuration, the user can determine whether each object (one object, or a plurality of objects) has been selected.

(6) In the simulation control device, the visual effect may be an animation.

It is possible to notify the user of a temporal change in the measured value in real time (or successively) by utilizing an animation.

(7) In the simulation control device, the animation may place a ring-shaped or subring-shaped gauge around an outer edge of the object, and change a length of the gauge corresponding to the measured value.

When the measured value is thus reflected in the length of the gauge, the user can intuitively determine the magnitude of the measured value, whether the measured value has increased or decreased, the speed at which the measured value increases, the speed at which the measured value decreases, and the like.

(8) In the simulation control device, the animation may place a line of marks around an outer edge of the object, and change a number of marks that form the line of marks corresponding to the measured value.

When the measured value is thus reflected in the number of marks that form the line of marks, the user can intuitively determine the magnitude of the measured value, whether the measured value has increased or decreased, the speed at which the measured value increases, the speed at which the measured value decreases, and the like.

(9) In the simulation control device, the animation may change an enhancement level with respect to the object corresponding to the measured value.

When the user is notified of the measured value using a change in the enhancement level with respect to the object, it is possible to provide a sufficient space around the object, and improve the degree of freedom with respect to the layout of the object. This configuration is effective when a number of objects are closely placed, for example. Note that the enhancement level with respect to the object may be adjusted using at least one of the following parameters, for example.

Density of object

Brightness of object

Color of object

Opacity of object

Saturation of object

Shape of object

Change pattern of at least one of density, brightness, color, opacity, saturation, and shape of object

(10) The simulation control device may further include an execution section that performs a predetermined process that is linked to the object when the selection of the object has been confirmed.

According to this configuration, the predetermined process is automatically performed when the selection of the object has been confirmed. Note that the predetermined process may be performed at a timing immediately after the selection of the object has been confirmed, or may be performed when a predetermined time has elapsed after the selection of the object has been confirmed. The predetermined process is a process that sets a simulation parameter, a process that attacks the object, a process that moves the object, a process that is performed on another object, or a process that executes a predetermined program, for example.

(11) According to another embodiment of the invention, there is provided a computer-readable non-transitory information storage medium storing a program that causes a computer to implement a simulation, the program being a simulation control program that causes the computer to function as:

a display processing section that displays a virtual space on a wearable image display device;

a measurement section that measures a gaze time of a user with respect to an object that is placed in the virtual space;

a reception section that determines that the object has been selected when a measured value obtained by the measurement has reached a first threshold value, and determines that the selection has been confirmed when the measured value has reached a second threshold value that is larger than the first threshold value; and a notification section that notifies the user of a magnitude of the measured value.

Note that some or all of the functions that are implemented by the simulation control device may be implemented by a server device or a terminal device. Part or the entirety of the program may be recorded (stored) in an information storage medium.

The exemplary embodiments of the invention are described below. Note that the following exemplary embodiments do not in any way limit the scope of the invention defined by the claims laid out herein. All of the elements described below in connection with the exemplary embodiments should not necessarily be taken as essential elements of the invention. The exemplary embodiments are described below taking an example in which a head-mounted display (HMD) is used as the wearable image display device, and the simulation control device is applied to a game system that provides a game while generating a virtual three-dimensional space in connection with (in synchronization with, or so as to be linked to) the movement of the user in a space (i.e., real space) defined by a structure.

1. Outline of Game System

Figure 2:
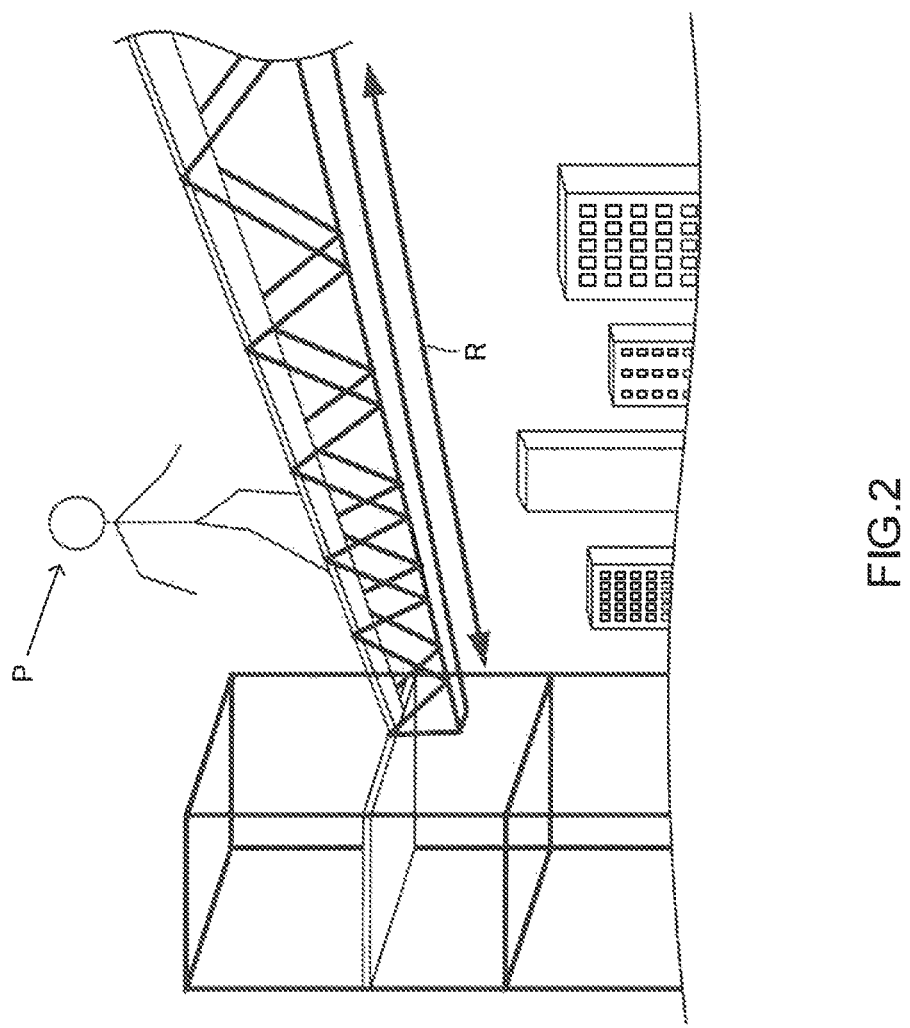
FIG. 2 illustrates a virtual three-dimensional space (simulation space) that can be experienced by means of a game system according to one embodiment of the invention.

An outline of a game system I according to one embodiment of the invention is described below with reference to FIGS. 1 and 2. FIG. 1 is a configuration diagram illustrating a schematic configuration of the game system 1, and FIG. 2 illustrates a virtual three-dimensional space (hereinafter may be referred to as "simulation space") that can be experienced by means of the game system 1.

The game system 1 mainly includes a structure 10 that defines a real space in which a player P (i.e., user) can move (hereinafter simply referred to as "real space"), and an HMD 20 that is worn by the player P, and displays a simulation image of the virtual three-dimensional space (i.e., simulation space) that is linked to the real space.

The game system 1 is a simulator that generates a simulation image that is viewed from the player P and represents the simulation space that corresponds to the real space, and allows the player P to experience various environments and situations within a pseudo-space.

The game system 1 is configured to (1) detect a player's state (i.e., the position and the attitude of the player in the real space) that represents the state of the player P the real space, (2) perform an image generation process that generates a simulation image corresponding to the detected player's state, the simulation image being viewed from the player P and representing the simulation space that corresponds to the real space, the simulation image including a virtual moving path that is linked to a moving path R (see FIG. 2, for example), (3) display the generated simulation image on the HMD 20, (4) determine that the player P is in a specific state in the simulation space when the player's state has satisfied a given condition within the moving path R, and (5) generate a simulation image that produces an effect based on the specific state when it has been determined that the player P is in the specific state.

The game system 1 includes a hanging unit 30 that hangs the HMD 20 from the structure 10. The hanging unit 30 hangs the HMD 20 independently of the player P so that the HMD 20 follows the motion of the player P when the player P moves in the real space, or a predetermined part (e.g., head) of the player P makes a motion, and the HMD 20 is continuously worn by the player P (or does not fall) even when the player P has fallen down.

As illustrated in FIG. 1, the game system 1 further includes (in addition to the structure 10, the HMD 20, and the hanging unit 30) (1) a fall prevention unit 40 that prevents a situation in which the player P who moves in the real space falls down; (2) a hanging control unit 50 that changes the hanging position of the HMD 20 with respect to the hanging unit 30 corresponding to the movement of the player P in the real space, and changes the hanging position of the player P corresponding to the movement of the player P in the real space; (3) a marker unit 60 that is attached to a predetermined part (e.g., head, both hands, and both feet) of the player P, and an imaging camera 70 that detects the direction and the position of the each part by detecting the marker unit 60, and detects the state (player's state) of the player P in the real space; (4) effect devices 90 to 93 and an effect object 80 that are disposed in the real space, and allow the player P to experience a given effect in synchronization with the simulation image; and (5) a simulation control device 100 that generates a simulation image that is viewed from the player P and represents the simulation space (virtual three-dimensional space) that is linked to the real space, and controls the effect devices 90 to 93 in synchronization with the simulation image corresponding to the detected player's state.

The game system 1 that is configured as described above can allow the player P to experience the specific state (simulation) when the player P is in the specific state in synchronization with the state of the player P, and can accurately reproduce the environment or the situation to be experienced by the player P (particularly an environment or a situation that is difficult to actually experience (e.g., a moving environment or situation at a height (including a situation in which the player P falls when the player P has run off the moving path R))).

For example, the game system 1 can reproduce an environment or a situation in a dangerous place (e.g., height (high place), closed place, special space, hot place, or cold place) car a space that is difficult to experience, corresponding to the state of the player P as a specific state or an environment that produces the specific state.

Specifically, the game system 1 can reproduce an arbitrary place or space dangerous place and a space that is difficult to experience), and allows the player P to have a more realistic experience even in a pseudo-space.

Since the game system 1 is configured so that the HMD 20 can be hung independently of the player P, it is possible to ensure that the HMD 20 is continuously worn by the player P, and does not fall even when the HMD 20 has been removed from the player P, even when the HMD 20 has moved in the forward-backward direction, the rightward-leftward direction, or the upward-downward direction, due to the movement of the player P in the real space, or the motion of a predetermined part (e.g., head) of the player P, or the player P has lost his/her balance, and fallen down.

Therefore, the game system 1 can prevent an unexpected situation in which the player P is injured when the player P has fallen down in a state in which the player P wears the HMD 20, or the HMD 20 collides with a floor or a wall surface due to unintentional removal, and breaks or malfunctions, for example.

Since the game system 1 is configured so that the HMD 20 can be hung at a suitable position, and can move or make a motion in an arbitrary direction as long as the hanging position of the HMD 20 can be changed using a rail, an arm, or the like so as to follow the movement of the player P, for example, it is possible to ensure that the player P who wears the HMD 20 can safely move in the real space, prevent a situation in which the player P is injured, and prevent an unexpected situation in which the HMD 20 breaks or malfunctions, for example.

For example, when an image is supplied to the HMD 20 through a cable, or the HMD 20 is controlled through a cable (e.g., when a high-resolution image is used), it is possible to provide a line that connects the HMD 20 and a control device that controls the HMD 20 through the hanging unit 30, and it is possible to prevent a situation in which the movement of the player P is limited, or the player P feels uncomfortable due to the presence of the line that is situated on the side of the player P, or around the feet of the player P.

Specifically, the above configuration makes it possible for the game system 1 to ensure smooth movement and safety with respect to the player P who wears the HMD 20 in the real space, and prevent an unexpected situation in which the player P is injured, for example.

Note that the embodiments of the invention are described below taking an example in which the game system 1 implements a game that allows the player to experience a fear of heights (hereinafter referred to as "fear of heights experience game").

2. Configuration of Game System
2-1. Structure

Figure 3:
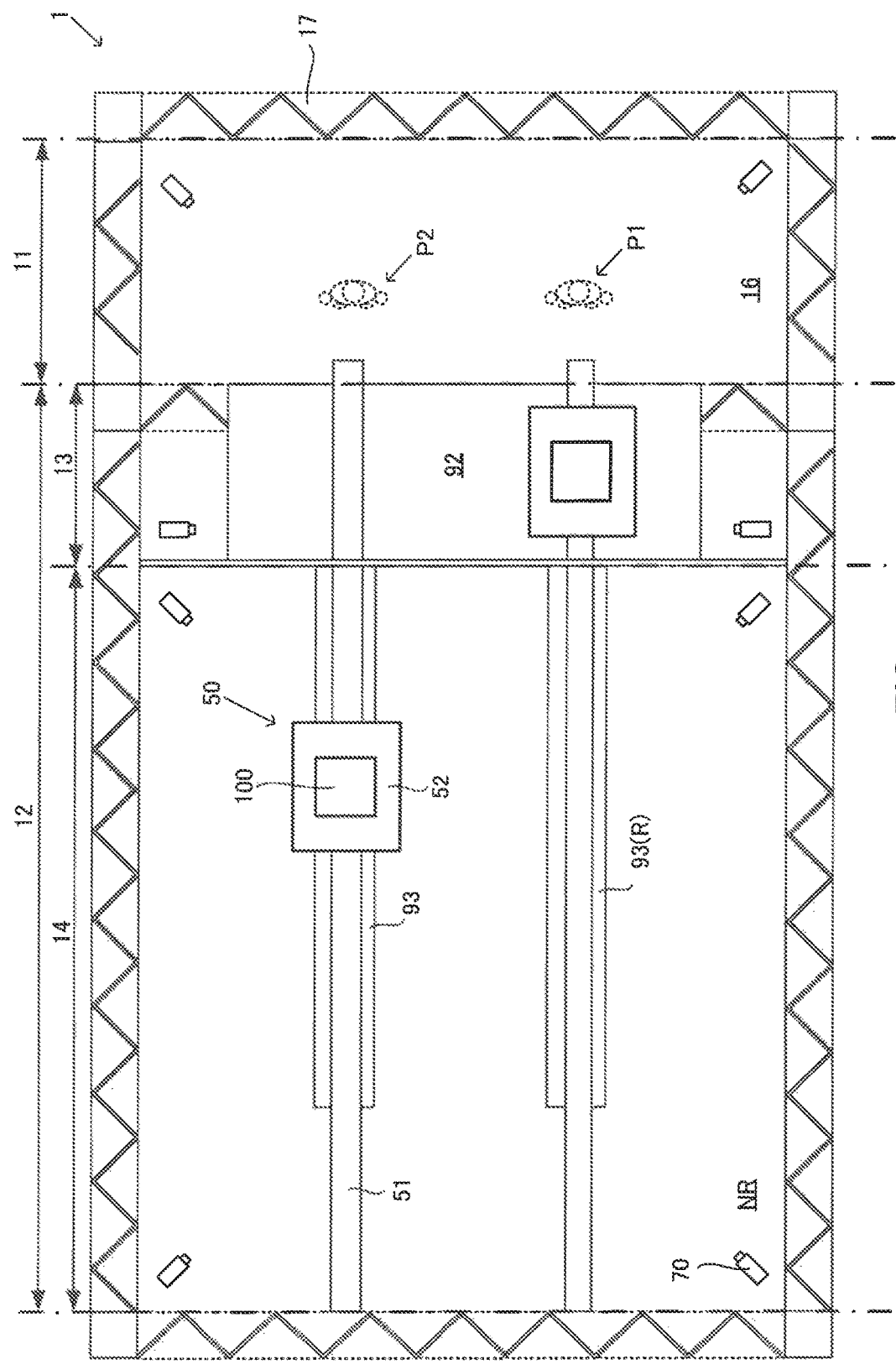
FIG. 3 is a plan view illustrating the configuration of a structure according to one embodiment of the invention.
Figure 4:
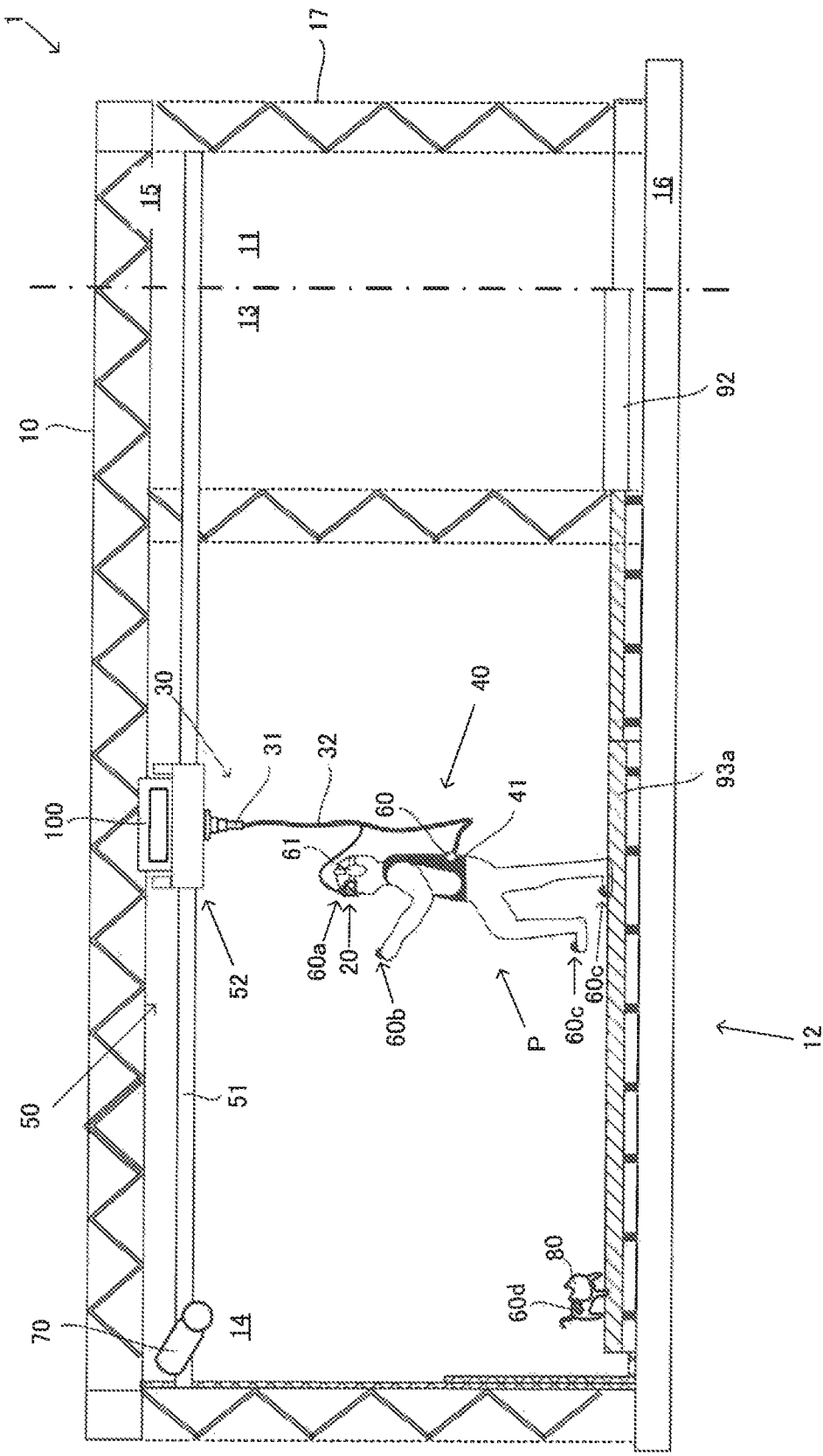
FIG. 4 is a cross-sectional view illustrating the configuration of a structure according to one embodiment of the invention.

The structure 10 included in the game system 1 is described below with reference to FIGS. 1, 3, and 4. FIG. 3 is a plan view illustrating the configuration of the structure 10, and FIG. 4 is a cross-sectional view illustrating the configuration of the structure 10.

The structure 10 is a housing that defines the real space in which the player P can move and the game is implemented. As illustrated in FIGS. 1, 3, and 4, the structure 10 has a box-like structure that is in the shape of a rectangular parallelepiped, and has a ceiling 15, a floor 16, and a wall 17 that defines (covers) each side of the real space, for example.

The structure 10 includes a standby area 11 in which the player P stands by before playing the experience-type game, and a play area 12 in which the player P plays the experience-type game. The play area 12 includes a start zone 13 in which the player P stands when starting the game, and a movement experience zone 14 in which the player P moves to experience a predetermined environment and situation, and the moving path R in which each player P can move during the game is formed.

A plurality of hanging control units 50 are provided to the ceiling 15 from the standby area 11 to the play area 12 so as to move along the moving path R in the movement experience zone 14, the plurality of hanging control units 50 being slidably provided with the hanging unit 30 that hangs the HMD 20, and the fall prevention unit 40 that prevents a situation in Which the player P falls down.

Each hanging control unit 50 is provided with the simulation control device 100 that corresponds to each moving path.

The ceiling 15 is provided with a plurality of imaging cameras 70 that are used to detect the player's state with respect to the player P and the state of the effect object 80, the plurality of imaging cameras 70 being provided at predetermined positions, The player's state with, respect to the player P includes the position and the direction (attitude) of the head of the player P.

The floor 16 differs in configuration corresponding to the standby area 11, the play area 12, the start zone 13, and the movement experience zone 14.

More specifically, the floor 16 is formed by a panel (spring floor panel) 92 that is provided with a spring that produces an elevator environment (i.e., effect means) in the start zone 13 included in the play area 12.

The movement experience zone 14 included in the play area 12 includes moving path R in which the player P walks, and which is formed by a predetermined member (moving path member 93 described later) (e.g., metal), a non-moving path NR in which the player P cannot move, and which is formed by a mat or the like that protects the player P when the player P has fallen down.

The start zone 13 has a. structure that provides a virtual three-dimensional space formed by the inner space of an elevator. An automatic door 91 (effect device) that functions as the door of an elevator and is opened and closed under control of the simulation control device 100, is provided at the boundary between the start zone 13 and the movement experience zone 14.

The effect object 80 is placed on the moving path R (i.e., at the end point of the moving path member 93). An effect device (e.g., blower 90) is optionally provided on the non-moving path NR, and a sensor unit (e.g., contact sensor) may also optionally be provided on the non-moving path NR.

The wall 17 is formed by a predetermined wall panel, or a mat that protects the player P from being injured due to a collision, for example.

2-2. HMD and Hanging Unit

The HMD 20 that is used to implement the game system 1, and the hanging unit 30 that hangs the HMD 20, are described below with reference to FIGS. 4, 5A, and 5B.

Figure 5A:
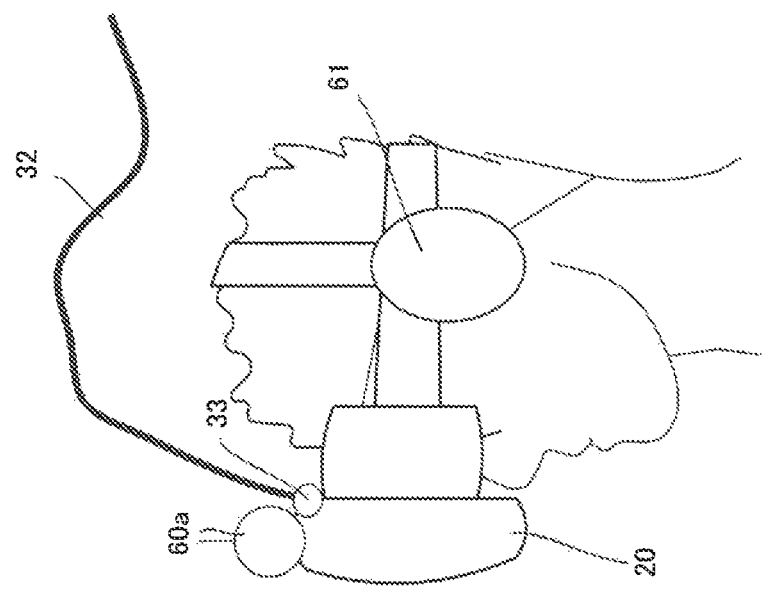
FIGS. 5A and 5B are respectively a perspective view and a side view illustrating the configuration of an HMD that is used to implement a game system according to one embodiment of the invention.
Figure 5B:
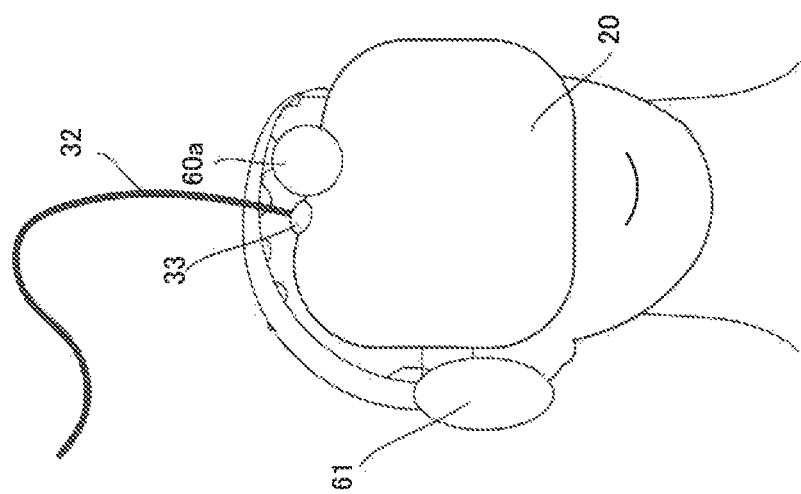

FIGS. 5A and 5B are respectively a perspective view and a side view illustrating the configuration of the HMD 20 that is used to implement the game system 1. The HMD 20 implements the wearable image display device according to the embodiments of the invention, for example.

The HMD 20 is a non-see-through wearable display device that is worn on the head of the player P, and displays an image of the virtual three-dimensional space under control of the simulation control device 100. The HMD 20 allows the player P to view only the displayed image (i.e., does not allow the player P to view the state of the external world), and allows the player P to visually experience augmented reality.

As illustrated in FIGS. 4, 5A, and 5B, the HMD 20 is configured to cover (mask) the entirety of each eye of the player P, and allow the player P to view the simulation image that is viewed from the player P, and represents the simulation space that is linked to the real space within the structure 10 in synchronization with the detected player's state.

A marker unit (head detection marker unit) 60*a* that is used to detect the direction and the position of the head of the player P is provided to the upper part of the HMD 20. The HMD 20 has a display size of 200×1080 pixels and a refresh rate of 90 fPS, for example.

The HMD 20 includes a headphone jack (not illustrated in the drawings), and a headphone 61 is connected to the headphone jack. The player P wears the headphone 61 together with the HMD 20. The headphone 61 outputs an ambient sound (stereophonic sound) in the simulation space that is generated by the simulation control device 100.

The hanging unit 30 is configured to connect the HMD 20 and the hanging control unit 50 that is disposed above the player P (e.g., provided to the ceiling 15 of the structure 10) so that the hanging unit 30 hangs the HMD 20 while being hung from the structure 10.

The hanging unit 30 is provided to the upper part (i.e., ceiling 15) of the structure 10 so as to be situated over the head of the player P such that the hanging unit 30 can hang the HMD 20 to be able to follow the movement and the motion of the player P in each direction within the play area 12.

The hanging unit 30 includes a line (hereinafter referred to as "cable") that connects the HMD 20 and the simulation control device 100 through a cable communication channel.

As illustrated in FIGS. 4, 5A, and 5B, the hanging unit 30 includes a link member 31 that is used to link the hanging unit 30 to the hanging control unit 50, a string-like member (cable) 32 that has an end (hereinafter referred to as "first end") that is shaped to be attached to the link member 31, and a connection member 33 that is used to connect a second end of the string-like member 32 that differs from the first end, to the HMD 20, for example.

The string-like member 32 has a structure that prevents a situation in which the HMD 20 reaches the floor of the structure 10 when the player P has made a large motion (e.g., when the player P is about to fall down), and the HMD 20 has been removed from the player P.

The string-like member 32 includes a cable that is stretchable, and transfers a predetermined signal and data transmitted from the simulation control device to the HMD 20.

For example, the string-like member 32 has a length that prevents a situation in which the HMD 20 reaches the floor of the structure 10 when the HMD 20 has been. removed from the player P, or is formed in a stretchable spiral shape that prevents a situation in which the HMD 20 reaches the floor of the structure 10 when the HMD 20 has been removed from the player P, or is configured so that the cable can be wound to adjust the length of the string-like member 32 and prevent a situation in which the HMD 20 reaches the floor of the structure 10 when the HMD 20 has been removed from the player P.

Note that it suffices that the HMD 20 be configured to be worn by the player P, and display an image so as to be viewable by the player P. The HMD 20 may be a see-through HMD as long as the simulation process can be accurately performed.

When a signal or data is transferred between the HMD 20 and the simulation control device 100 through a wireless communication channel, the string-like member 32 need not necessarily be a cable, but may be a string formed of a predetermined material, or may be a band-like member having a certain width.

The link member 31 and the string-like member 32 included in the hanging unit 30 are used in common by the hanging unit 30 and the fall prevention unit 40 (as described below).

2-3. Fall Prevention Unit

The fall prevention unit 40 included in the game system 1 is described below with reference to FIG. 4.

The fall prevention unit 40 is used to support the player P and prevent the player P from falling down when the player P has lost his/her balance, or when the player P has lost his/her balance and fallen down since the player P wears the HMD 20, or since the moving path R in which the player P can walk is narrow, or since the player P wears the HMD 20, and the moving path R in which the player P can walk is narrow.

The fall prevention unit 40 is configured so that it is possible to prevent a situation in which the HMD 20 breaks, or the player P is injured, when the player P has lost his/her balance, and also prevent a situation in which the player P falls down (e.g., the player P loses his/her balance during movement, and falls down) due to the HMD 20 that is worn by the player P during the game.

As illustrated in FIG. 4, the fall prevention unit 40 includes a holder member 41 that holds the player P, and a hanging member that hangs the player P from the structure 10, and the hanging member is implemented by the link member 31 and the string-like member 32 included in the hanging unit 30, for example.

The holder member 41 is implemented by a vest-type jacket, for example. The holder member 41 is worn by the player P during the game, and holds the player P during the game. The holder member 41 is connected to one end of the string-like member 32, and supports the body of the player P through the link member 31 that is provided to the ceiling 15 of the structure 10.

2-4. Hanging Control Unit

The hanging control unit 50 that is included in the game system 1 is described below with reference to FIGS. 1, 3, and 4.

The hanging control unit 50 is a unit that changes the hanging position of the player P and the hanging position of the HMD 20 corresponding to the movement of the player P in the real space that is defined by the structure 10. The hanging control unit 50 is configured to necessarily hang the HMD 20 and the player P from above (i.e., from the ceiling of the structure 10).

The hanging control unit 50 is configured to hang the HMD 20 and the player P at an appropriate position in the real space so as to follow the movement and the motion of the player P in the moving direction. The hanging control unit 50 is configured to prevent an unexpected situation in which the player P is injured during the simulation, or the HMD 20 breaks or malfunctions while ensuring safety with respect to the player P, for example.

Therefore, the hanging control unit 50 can appropriately prevent a situation in which the movement of the player P is limited, or the player P feels uncomfortable (due to a cable that supplies a signal and data to the HMD 20, and a member that holds the player P and is provided on the side of the player P or under the player P) even when the player P arbitrarily moves in the real space, and can appropriately and necessarily hang the HMD 20 and the player P even when the player P moves or makes a motion.

More specifically, the hanging control unit 50 is integrally formed from the standby area 11 to the play area 12, and is configured so that the HMD 20 and the fall prevention unit 40 follow the player P who moves in the real space, or the player P who changes in attitude.

For example, the hanging control unit 50 includes a rail 51 that is provided corresponding to each player P who moves in the real space, and formed along the moving direction of the player P from the standby area 11 (i.e., a point at which the player P wears the HMD 20 and the fall prevention unit) to the play area 12, and a sliding member 52 that is connected to the link member 31 of the hanging unit 30, and slides along the rail 51 (see FIGS. 1, 3, and 4).

Each rail 51 is provided to the ceiling over the moving path R in the movement experience zone 14 in which the player P moves along the moving path R (i.e., a zone in which the player P linearly moves in the forward-backward direction).

In an area in the real space other than the movement experience zone 14, each rail 51 is provided along path (hereinafter referred to as "guiding path") S along which the player P is guided to the start position and the like when the player P plays the simulation after the player P has worn the HMD 20 and the fall prevention unit 40.

Note that the rail 51 is riot limited as to the shape, the material, and the like as long as the position of the hanging unit 30 can be changed corresponding to the movement of the player P.

The sliding member 52 slides along the rail 51 according to the tension produced corresponding to the state (e.g., movement or change in attitude) of the player P, and changes the hanging position of the HMD 20 and the player P through the hanging unit 30.

As illustrated in FIGS. 1, 3, and 4, the sliding member 52 is configured so that the simulation control device 100 is secured thereon in order to reduce the length of the cable that electrically connects the HMD 20 and the simulation control device 100, and appropriately transfer a signal and data, and slides together with the simulation control device 100.

The sliding member 52 is not particularly limited as long as the sliding member 52 slides along the rail 51, changes the hanging position of the HMD 20 and the player P through the hanging unit 30 corresponding to the state (e.g., movement or change in attitude) of the player P.

2-5. Simulation Control Device

The simulation control device 100 included in the game system 1 is described below with reference to FIG. 6.

Figure 6:
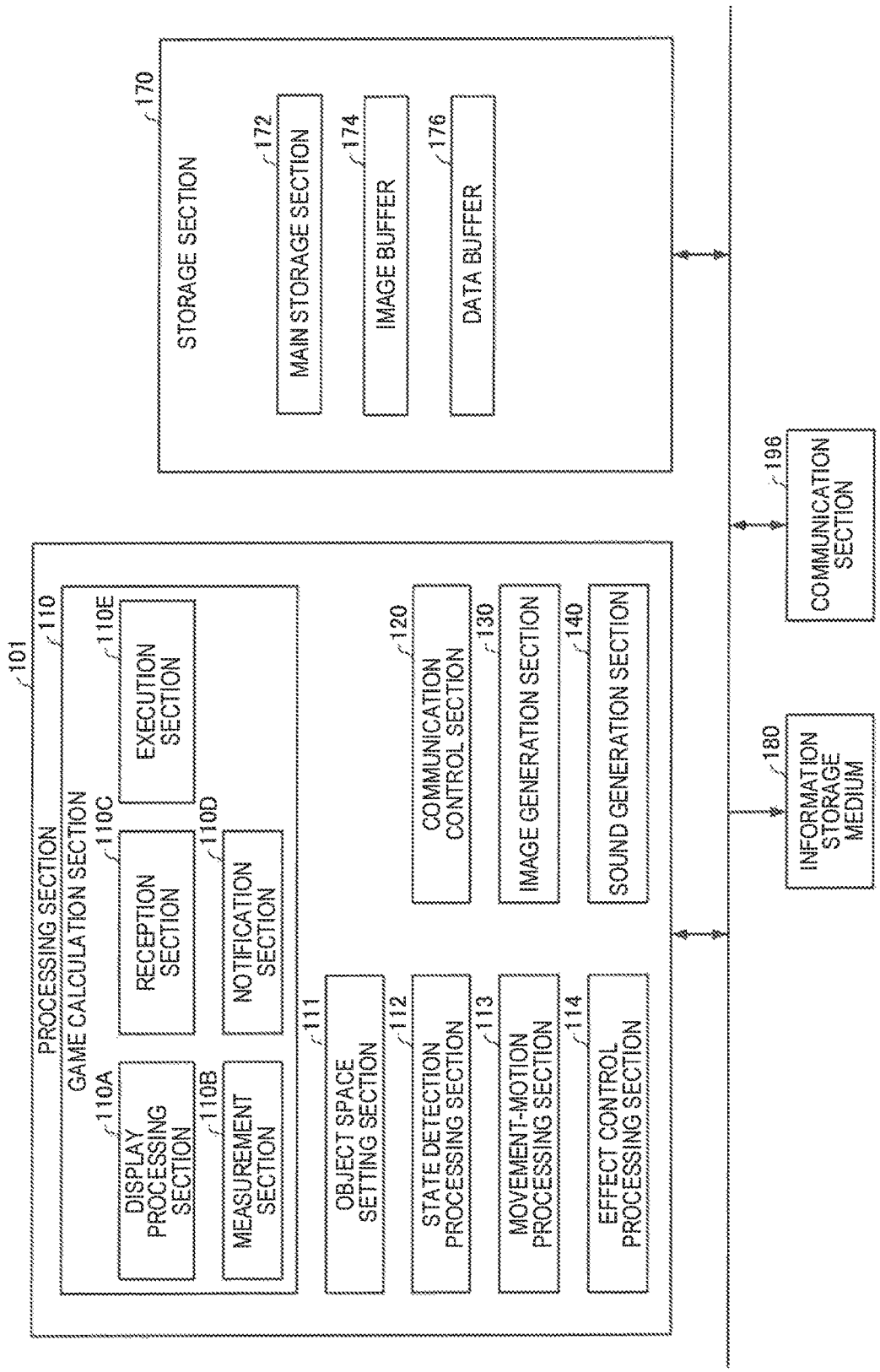
FIG. 6 is a configuration diagram illustrating the block configuration of a simulation control device according to one embodiment of the invention.

FIG. 6 is a configuration diagram illustrating the Hock configuration of the simulation control device 100. Note that the configuration of the simulation control device 100 is not limited to the configuration illustrated in FIG. 6. Various modifications and variations may be made, such as omitting some of the elements illustrated in FIG. 6, or providing an additional element.

The simulation control device 100 is implemented by a computer-controllable device (computer) such as a personal computer. An operation section (e.g., keyboard) (not illustrated in FIG. 6) that is operated by the administrator is removably provided to the simulation control device 100.

The simulation control device 100 that provides the simulation space to the player P is configured to generate an image that corresponds to the state of the game While proceeding with the game corresponding to the player's state and the elapsed time, and controls the effect devices 90 to 93 in synchronization with the effect control device.

The simulation control device 100 acquires an image output from the imaging camera 70, detects a marker due to the marker unit 60 from the acquired image, and detects the player's state based on the positional relationship between the area to which the marker belongs, and another marker, and the time of stay in the area to which the marker belongs.

The simulation control device 100 includes a storage section 170 that stores various types of data, an information storage medium 180 that stores data (e.g., simulation application), a processing section 101 that performs various processes that implement the game and generate a simulation environment, and a communication section 196.

The storage section 170 serves as a work area for the processing section 101 and the communication section 196. The function of the storage section 170 may be implemented by a RAM (DRAM or VRAM) or the like. The storage section 170 includes a main storage section 172 that mainly stores (records) a game program, an image buffer 174, and a data buffer 176.

The main storage section 172 mainly stores (records) the game program. The data buffer 176 is a storage area that stores game data. For example, the data buffer 176 may be included in a main storage, and may be controlled (with respect to a read-out process and a writing process) by means of software.

The game program is software that includes an instruction code for executing the game process. The game data includes data for determining whether or not the player is in the specific state, data required when executing the game program, data with respect to the effect object 80, a control program for controlling the effect devices 90 to 93, and the like.

The information storage medium 180 (computer-readable; medium) stores a program, data, and the like. The function of the information storage medium 180 may be implemented by an optical disk (CD or DVD), a hard disk drive (HDD), a memory (e.g., ROM), or the like.

The processing section 101 performs various processes according to one embodiment of the invention based on a program (data) stored in the information storage medium 180. Specifically, a program that causes a computer (i.e., a device that includes an operation section, a processing section, a storage section, and an output section) to function as each section according to one embodiment of the invention (i.e., a program that causes a computer to perform the process of each section) is stored in the information storage medium 180.

The communication section 196 communicates with the HMD 20 through a cable, and communicates with the imaging camera 70 and the effect devices 90 to 93 through a cable or wireless network. The function of the communication section 196 may be implemented by hardware such as a communication ASIC or a communication processor, and communication firmware.

A program (data) that causes a computer to function as each section according to one embodiment of the invention may be distributed to the information storage medium 180 (or the storage section 170) from an information storage medium included in a host device (server system) (not illustrated in the drawings) through a network and the communication section 196. Use of the information storage medium included in the host device is also intended to be included within the scope of the invention.

The processing section 101 (processor) performs a game calculation process, an image generation process, a sound generation process, an effect control process, and the like based on the timing with respect to the game start timing, data of an image output from the imaging camera 70 (hereinafter referred to as "image data"), a program, and the like.

The processing section 101 performs various processes using the storage section 170 as a work area. The function of the processing section 101 may be implemented by hardware such as a processor (e.g., CPU or ORO or an ASIC (e.g., gate array), and a program.

The processing section 101 includes a game calculation section 110, an object space setting section 111, a state detection processing section 112, a movement-motion processing section 113, an effect control processing section 114, a communication control section 120, an image generation section 130, and a sound generation section 140. Note that the processing section 101 may have a configuration in which some of these sections are omitted.

The game calculation section 110 performs a process that starts the game when a game start condition has been satisfied, a process that proceeds with the game, a process that places an object (including the effect object 80) necessary for forming the simulation space, a process that displays an object, a process that terminates the game when a game termination condition has been satisfied, a determination process that determines whether or not the player's state is the specific state (i.e., the corresponding state during the game), and the like.

The game calculation section 110 detects the line-of-sight direction of the player P and an area that intersects the line of sight of the player P (hereinafter referred to as "line-of-sight area") corresponding to the detected player's state (i.e., the position of the player P in the real space, and the attitude of the player P), and sets a space that is viewed from the player P within the three-dimensional space corresponding to the detected line-of-sight direction, the detected line-of-sight area, the current game environment, and the state of the game.

The game calculation section 110 determines whether or not the game termination condition has been satisfied corresponding to the detected player's state, or based on a predetermined elapsed time from the start of the game, and terminates game when it has been determined that the game termination condition has been satisfied.

The game calculation section 110 determines whether or not the player P is in the specific state during the game corresponding to the detected player's state based on the data stored in advance in the data buffer 176, and proceeds with the game corresponding to the determination result. The game calculation section 110 also instructs the effect control processing section 114, the image generation section 130, and the sound generation section 140 to implement the corresponding effect.

The object space setting section 111 places an object (i.e., an object formed by a primitive such as a polygon, a free-form surface, or a subdivision surface) (e.g., effect object 80, building, moving path R, pillar, wall, and map (geographical feature)) that is used to form a predetermined simulation space in an object space (i.e., virtual three-dimensional space).

Specifically, the object space setting section 111 determines the position and the rotational angle (synonymous with orientation or direction) of the object in a world coordinate system, and places the object at the determined position (X, Y, Z) and the determined rotational angle (rotational angles around X, Y, and Z-axes).

In one embodiment of the invention, the effect object 80 includes a moving object (e.g., animal) that appears in the simulation space (hereinafter referred to as "effect moving object"), and an object that is placed in the real space so that the player P can determine a stationary object placed in the simulation space (hereinafter referred to as "effect stationary object"), and the object space setting section 111 places these effect objects 80 in the simulation space.

In one embodiment of the invention, the effect moving object includes an object that moves in the real space, and also moves in the simulation space (when imaged) (hereinafter referred to as "true moving object"), and an object that does not move in the real space, and moves only in the simulation space (when imaged) (hereinafter referred to as "pseudo-moving object").

The state detection processing section 112 determines the positions of the marker units 60 provided to both hands and both feet of the player P and the upper part of the HMD 20 at an identical timing within the image (hereinafter referred to as "player's image") of the player P output from a plurality of imaging cameras 70 that capture the player P.

The state detection processing section 112 detects the player's state that represents the position and the attitude of the player P in the real space based on the position of each marker unit 60 within each image, the positional relationship between the marker units 60, and the time of stay of each marker unit 60 at each position.

A plurality of predetermined areas in the real space are set to the image output from each imaging camera 70. The state detection processing section 112 detects the position of each marker unit 60 in the real space on an image frame basis by detecting the position of each marker unit 60 included in each player's image at an identical timing as to an area to which each marker unit 60 belongs.

The state detection processing section 112 compares the detected position of each marker unit 60 with the position of each marker unit 60 in the previous frame while detecting the position of each marker unit 60 in the real space on a frame basis, and detects the time of stay of each marker unit 60 at an identical position based on the number of frames in which each marker unit 60 has been detected to be situated at an identical position.

The state detection processing section 112 detects the attitude of the player P in the real space based on the position of each marker unit 60 in the real space at an identical timing, and the time of stay of each marker unit 60.

For example, the state detection processing section 112 (1) determines the position of the player P in the real space (i.e., the coordinates of the center position (center-of-gravity position) of the player P in the real space) based on information (hereinafter referred to as "part information") about at least one of the position, the height, and the time of a given part (e.g., head, both hands, or both feet) of the player P, (2) determines the attitude of the player P represented by the positional relationship between each part (e.g., head, body, hands, and feet) of the player P based on the part information about the player P, or (3) detects the player's state based either or both of the position and the attitude of the player P.

The state detection processing section 112 (A) detects the viewpoint position and the viewpoint direction of the player P in the real space based on the position of the head of the player P, (B) detects the position and the attitude of the player P in the real space based on the position of the hand or the foot of the player P, and (C) models the player P (forms bones) based on the position and the attitude of the player P.

For example, the parts of the user include the head, the hand, or the foot of the user, and the part information includes information about the position (position coordinates in the user movement space), the direction, the shape (planar shape and three-dimensional shape), the color (including a grayscale), and the like about each part.

The state detection processing section 112 determines the position of the marker unit 60 provided to the effect moving object in the real space in the same manner as described above, and detects the position (i.e., the position of the center or the center of gravity) of the effect moving object in the real space based on the position of the marker unit 60 in the real space optionally together with the state of the effect moving object.

The movement-motion processing section 113 calculates the positional relationship between the player P and the effect object 80 based on the detected player's state, the current game environment, the state of the game, or information about two or more items among the player's state, the current game environment, and the state of the game, and performs a movement-motion calculation process (movement-motion simulation process) on the effect object 80 based on the calculated positional relationship between the player P and the effect object 80.

More specifically, the movement-motion processing section 113 causes various objects to move or make a motion (animation) in the object space based on the detected player's state and the like.

More specifically, the movement-motion processing section 113 performs a simulation process that sequentially calculates movement information (position, rotational angle, speed, or acceleration) and motion information (i.e., the position or the rotational angle of each part that forms the object) about each object every frame (1/60th of a second).

Note that the term "frame" refers to a time unit used when the object movement-motion process (simulation process) and the image generation process are performed.

The movement-motion processing section 113 calculates the movement information and the motion information about the effect moving object based on the position of the effect moving object in the real space, the positional relationship between the effect moving object and the player P in the real space, the state of the effect moving object (i.e., the moving direction and the attitude of the effect moving object), the current game environment, and the state of the game.

The movement-motion processing section 113 calculates the movement information and the motion information about the pseudo-moving object (effect moving object) in the simulation space based on either or both of the position and the state of the pseudo-moving object in the real space corresponding to the user's state in synchronization with the position and the state in the real space, or so that an image can be formed in a seamless manner with respect to the position and the state in the real space.

For example, when the pseudo-moving object is an animal object (e.g., cat), the movement-motion processing section 113 calculates the movement information and the motion information about the pseudo-moving object so that the pseudo-moving object makes a motion at a position that differs from the position at which the pseudo-moving object is placed in the real space, or moves over different areas, returns to the position at which the pseudo-moving object is placed in the real space at a predetermined timing, and is placed in the same manner as in the real space.

In such a case, the movement-motion processing section 113 calculates the movement information and the motion information so that the pseudo-moving object is visualized (imaged) at the position at which the pseudo-moving object is placed in the real space, and the motion (e.g., attitude and gesture) of the pseudo-moving object is visualized.

More specifically, the movement-motion processing section 113 calculates the movement information and the motion information so as to visualize (1) the pseudo-motion of a cat object (pseudo-moving object) around the player P even when the cat object is placed at the end point of the moving path R in the real space when the game has started, (2) the motion of the cat object that changes from the pseudo-motion to the actual state when the cat object moves toward the position at which the cat object is placed in the real space when the player P has advanced by a constant distance toward the end point of the moving path R, and is set to the same state as that in the real space, (3) the pseudo-motion of the cat object (e.g., various gestures when the player P has hold the cat object) that does not change in the real space, and (4) the motion of the cat object that is synchronized with the movement in the real space when the player P has hold the cat object, and released the cat object (when the cat object falls).

The effect control processing section 114 performs a process that controls the effect devices 90 to 93 corresponding to the player's state (including the specific state), the state of the effect moving object, the current game environment, and the state of the game. More specifically, the effect control processing section 114 performs an ON/OFF control process on the effect devices 90 to 93, a process that changes the ability of the effect devices 90 to 93, or a control process based on a program set in advance.

For example, when the blower 90 is used as the elect devices 90 to 93, the effect control processing section 114 performs a drive control process (blow control process) and a stop control process. When a temperature control device is used as the effect devices 90 to 93, the effect control processing section 114 performs a temperature control process. When the moving path R is used as the effect devices 90 to 93, the effect control processing section 114 controls the effect devices 90 to 93 that should be changed corresponding to the state of the player P (e.g., controls a swing unit provided to the moving path R, or controls a vibration unit).

The communication control section 120 performs a process that generates data (mainly image data for presenting the simulation space to the player P) that is transmitted to the HMD 20. The communication control section 120 transmits and receives a control signal that controls the effect devices 90 to 93.

The image generation section 130 performs a drawing process based on the results of various processes (game process) performed by the processing section 101, and various types of information such as the player's state (including the specific state) to generate an image (particularly an image that presents the simulation space to the player P), and outputs the generated image to the HMD 20 through the communication control section 120.

The image generation section 130 acquires object data (model data) that includes vertex data (e.g., vertex position coordinates, texture coordinates, color data, normal vector, or alpha value) with respect to each vertex of the object (model), and performs a vertex process (i.e., a shading process using a vertex shader) based on the vertex data included in the acquired object data (model data).

The image generation section 130 may optionally perform a vertex generation process (tessellation, curved surface division, or polygon division) for subdividing the polygon when performing the vertex process.

When the image generation section 130 performs the vertex process, the image generation section 130 performs a vertex movement process and a geometric process such as a coordinate transformation process (world coordinate transformation process and camera coordinate transformation. process), a clipping process, or a perspective transformation process, according to a vertex processing program (vertex shader program or first shader program), and changes (updates or adjusts) the vertex data with respect to each vertex of the object based on the processing results.

The image generation section 130 performs a rasterization process (scan conversion process) based on the vertex data subjected to the vertex process to link the surface of the polygon (primitive) to pixels.

The image generation section 130 then performs a pixel process (i.e., a shading process using a pixel shader, or a fragment process) that draws the pixels that form the image (fragments that form the display screen).

The image generation section 130 implements the pixel process by determining the final drawing color of each pixel that forms the image by performing various processes such as a texture readout (texture mapping) process, a color data setting/change process, a translucent blending process, and an anti-aliasing process, according to a pixel processing program (pixel shader program or second shader program), and outputting (drawing) the drawing color of the object subjected to a perspective transformation process to (in) the storage section 170 (i.e., a buffer that can store image information on a pixel basis (VRAM or rendering target)).

The image generation section 130 also performs a per-pixel process that sets or changes the image information (e.g., color, normal, luminance, and alpha-value) on a pixel basis. The image generation section 130 thus generates an image viewed from the player P in the object space.

The vertex process and the pixel process are implemented by hardware that enables a programmable polygon (primitive) drawing process (i.e., a programmable shader (vertex shader and pixel shader)) based on a shader program written in shading language.

The programmable shader enables a programmable per-vertex process and a programmable per-pixel process to increase the degree of freedom with respect to the drawing process so that the representation capability can be significantly improved as compared with a fixed drawing process using hardware.

The image generation section 130 performs a geometric process, a texture mapping process, a hidden surface removal process, an alpha-blending process, and the like when drawing the object.

The geometric process includes performing a coordinate transformation process, a clipping process, a perspective projection transformation process, a light source calculation process, and the like on the object.

The image generation section 130 stores the object data (e.g., object's vertex position coordinates, texture coordinates, color data (brightness data), normal vector, or alpha-value) subjected to the geometric process (perspective transformation process) in the storage section 170.

The image generation section 130 performs a texture mapping process that maps a texture (texel value) stored in the storage section 170 onto the object. More specifically, the image generation section 130 reads a texture (surface properties such as color (RGB) and alpha-value) from the storage section 170 using the texture coordinates set (assigned) to the vertices of the object, and the like.

The image generation section 130 maps the texture (two-dimensional image) onto the object. In this case, the image generation section 130 performs a pixel-texel link process, a bilinear interpolation process (texel interpolation process), and the like.

The image generation section 130 performs the hidden. surface removal process using a Z-buffer method (depth comparison method or Z-test) that utilizes a Z-buffer (depth buffer) that stores the Z-value (depth information) of the drawing pixel.

Specifically, the image generation section 130 refers to the Z-value stored in the Z-buffer when drawing the drawing pixel that corresponds to the primitive of the object. The image generation section 130 compares the Z-value stored in the Z-buffer with the Z-value of the drawing pixel of the primitive. When the Z-value of the drawing pixel is the Z-value in front of the player P (e.g., a small Z-value), the image generation section 130 draws the drawing pixel, and updates the Z-value stored in the Z-buffer with a new Z-value.

The image generation section 130 performs a translucent blending process (e.g., normal alpha-blending process, additive alpha-blending process, or subtractive alpha-blending process) based on the alpha-value (A value).

Note that the alpha-value is information. that can be stored so as to be linked to each pixel (texel or dot), such as additional information other than the color information. The alpha-value can be output as mask information, translucency (equivalent to transparency or opacity), bump information, or the like.

The sound generation section 140 performs a sound process based on the results of various processes performed by the processing section 101 with respect to the player's state (including the specific state) and the like to generate a game sound (i.e., an ambient sound (stereophonic sound) in the simulation space) (e.g., background music (BGM), effect sound, or voice), and outputs the generated game sound to the headphone 61 through the HMD 20.

2-6. Player Marker Unit and Imaging Camera

The player marker unit 60 and the imaging camera 70 included in the game system 1 are described below with reference to FIGS. 1 and 4.

In one embodiment of the invention, the marker units 60 are provided to a plurality of parts of each player P in order to detect the player's state (see above). More specifically, the marker units 60 are provided to the head, both hands, and both feet of each player P (see FIGS. 1 and 4).

Each marker unit 60 is formed using a material (e.g., reflecting sheet) having a reflecting surface. Each marker unit 60 is formed by a spherical marker. For example, each marker unit 60 reflects the applied light, and emits white light or light in a specific color.

More specifically, the marker units 60 include a head detection marker unit 60a, a right hand or left hand detection marker unit 60b, and a right foot or left foot detection marker unit 60c.

A light source unit (not illustrated in the drawings) that applies light to each marker unit 60 is provided in a movement experience area within the structure 10.

The emission color of the marker unit 60 is not particularly limited. When a plurality of players P are simultaneously present in the movement experience area, the emission color of the marker unit 60 may be changed on a player (P) basis, or may be changed on a part basis.

Each imaging camera 70 is placed at a predetermined position within the structure 10 (see FIG. 1, for example). Each imaging camera 70 forms an image of an area captured within the angle of view, and sequentially outputs the image data to the simulation control device 100.

Each imaging camera 70 is provided outside the moving range (i.e., moving path R) of the player P in the real space.

Each imaging camera 70 is placed so as to be able to image the play area 12, and image each player P who moves within the play area 12, or changes the attitude, or moves within the play area 12 and changes the attitude.

Each imaging camera 70 includes a predetermined image sensor (e.g., CCD), and a lens that has a predetermined focal length. Each imaging camera 70 images an area within a predetermined angle of view at a predetermined focal length, and sequentially outputs the image data to the simulation control device 100.

When the player P can freely move within the play area 12, it is necessary to image the entire play area 12, and each imaging camera 70 is placed so that the entire play area 12 can be imaged.

Each imaging camera 70 must be a color camera when it is desired to detect a. colored marker unit 60.

The number and the placement positions of marker units 60 are not limited to those described above. The number and the placement positions of marker units 60 are not basically limited as long as the marker units 60 can be captured using the imaging cameras 70.

2-7. Effect Object and Effect Device
2-7-1. Configuration

Figure 7B:
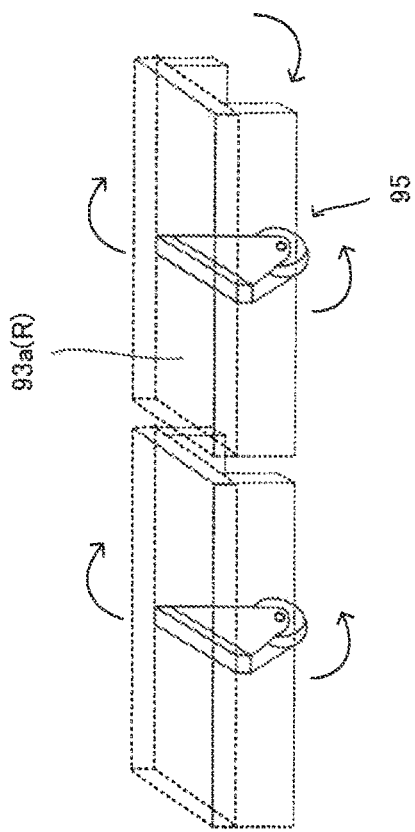
FIGS. 7A and 7B illustrate an example of an effect object and a moving path member (effect device) according to one embodiment of the invention.
Figure 7A:
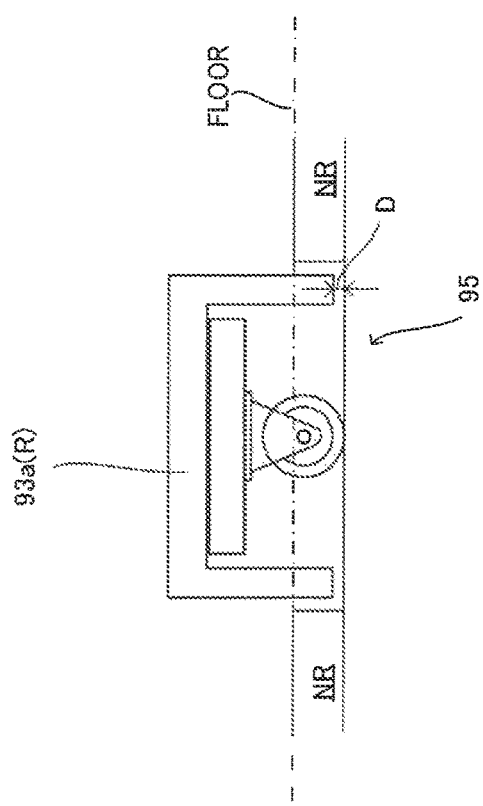

The effect object 80 and the effect devices 90 to 93 included in the game system 1 are described below with reference to FIGS. 1, 3, 4, 7A and 7B. FIGS. 7A and 7B illustrate an example of the moving path member 93 (i.e., effect device).

The effect object 80 and the effect devices 90 to 93 are placed in the real space defined by the structure 10, and are configured to allow the player P to experience a given effect in synchronization with the simulation image under control of the simulation control device 100.

The effect Object 80 and the effect devices 90 to 93 are used to allow the player P to experience the simulation space (e.g., outdoor space, indoor space, height (high place), closed place, dangerous place, special space, hot place, or cold place), and allow the player P to experience the non-simulation situation in synchronization with the simulation image to provide an effective simulation.

More specifically, the effect object 80 is classified as the effect moving object or the effect stationary object, and the effect moving object is classified as the true moving object or the pseudo-moving object (see above)

The pseudo-moving object is visualized in a state that differs from the state of the effect object 80 in the real space.

The effect moving object is provided with a marker unit 60d for detecting the position of the effect moving object in the real space, the positional relationship between the effect moving object and the player P in the real space, and the state of the effect moving object (i.e., the moving direction and the attitude of the effect moving object).

The simulation control device 100 determines either or both of the position and the state of the effect moving object in the real space by capturing the marker unit 60d using the imaging camera 70.

For example, the marker unit 60d provided to the effect object 80 may be the same as the marker units 60a, 60b, and 60c provided to each part of the player P. Note that it is desirable that the marker unit differ between a plurality of players P and the effect object 80 that appears in the game so as to distinguish the color of the marker units 60a, 60b, and 60c provided to each part of the player P and the stored information.

Note that a vibration unit may be provided in the effect object 80, and the simulation control device 100 may control the vibration of the vibration unit to produce an effect that surprises the player P in synchronization with the simulation image, or independently of the simulation image.

The effect devices 90 to 93 are devices that are used reliably generate the simulation space as a more realistic space, and provide a given effect directly to the player P.

The effect devices 90 to 93 include a structure-type effect device that is placed in the real space, and provides a given effect to the player P due to the placement and the structure in synchronization with the simulation image, and a synchronization-type effect device that provides a given effect corresponding to the detected player's state, the game environment, and the state of the game.

Examples of the synchronization-type effect device include the blower 90 illustrated in FIG. 1, and an effect device (e.g., temperature control device, illumination device, or vibration device) (not illustrated in the drawings) that forms the environment of the simulation space.

Examples of the structure-type effect device include the moving path member 93 that forms the moving path R, a start block (not illustrated in the drawings) that provides the start point, and a member that allows the player P to experience a touch feeling (e.g., convexities and concavities or a material for a wall surface and a floor) (e.g., the spring floor panel 92 that provides an elevator).

For example, the blower 90 blows air toward the front side of the player P when the player P has entered the movement experience zone 14 from the start zone 13, and blows air toward the front side of the player P from the lower side of the player P when the player P has moved to the moving path R (see FIGS. 1 and 4).

The moving path member 93 includes an effect area 93a that is provided under the moving path R in which the player P moves, and is formed to vibrate or swing corresponding to the simulation image (see FIGS. 3, 7A, and 7B).

Specifically, the moving path member 93 in the effect area 93a is formed to have a different height (height in the direction toward the ceiling) with respect to the floor (non-moving path NR) of the structure 10 (see FIG. 7A).

The moving path member 93 in the effect area 93a includes a plurality of driver units 95 that vibrates or swings the effect area based on a given condition (e.g., a condition whereby the player P has started walking on the moving path member 93).

Each driver unit 95 includes a wheel 96 that rotates in the direction orthogonal to the moving path direction (travel direction of the player P) (the moving path member 93 is horizontal to the floor), and a support plate 97 that has a gap D having a predetermined height (e.g., 5 mm) from the surface with which the wheel 96 comes in contact, and supports the moving path member 93.

The driver units 95 are adjacently disposed in the effect area 93a along the moving path R.

The moving path member 93 in the effect area 93a may be configured so that the entire moving path R is formed by the driver unit 95, or may be configured so that the moving path R is formed by the driver unit 95 and the moving path member 93 that is not driven. FIG. 7B illustrates an example in which the driver units 95 continuously form the moving path R.

The driver unit may be configured to vibrate or swing independently (see FIGS. 7A and 7B), or may be configured so that the vibration motion and the swing motion are mechanically controlled by the effect control processing section 114.

The structure or the form of the effect device may be changed only within the simulation space. Specifically, the structure or the form of the effect object and the effect device may not be changed in the real space, and may be changed only within the simulation space.

For example, when a predetermined event has occurred, the image generation section 130 may change the structure or the form of the effect object and the effect device (i.e., reduce the width of the moving path member 93, or move the wall 17 toward the player P, or move the ceiling 15 downward) only within the simulation space.

2-7-2. Operation of Game System

Figure 8:
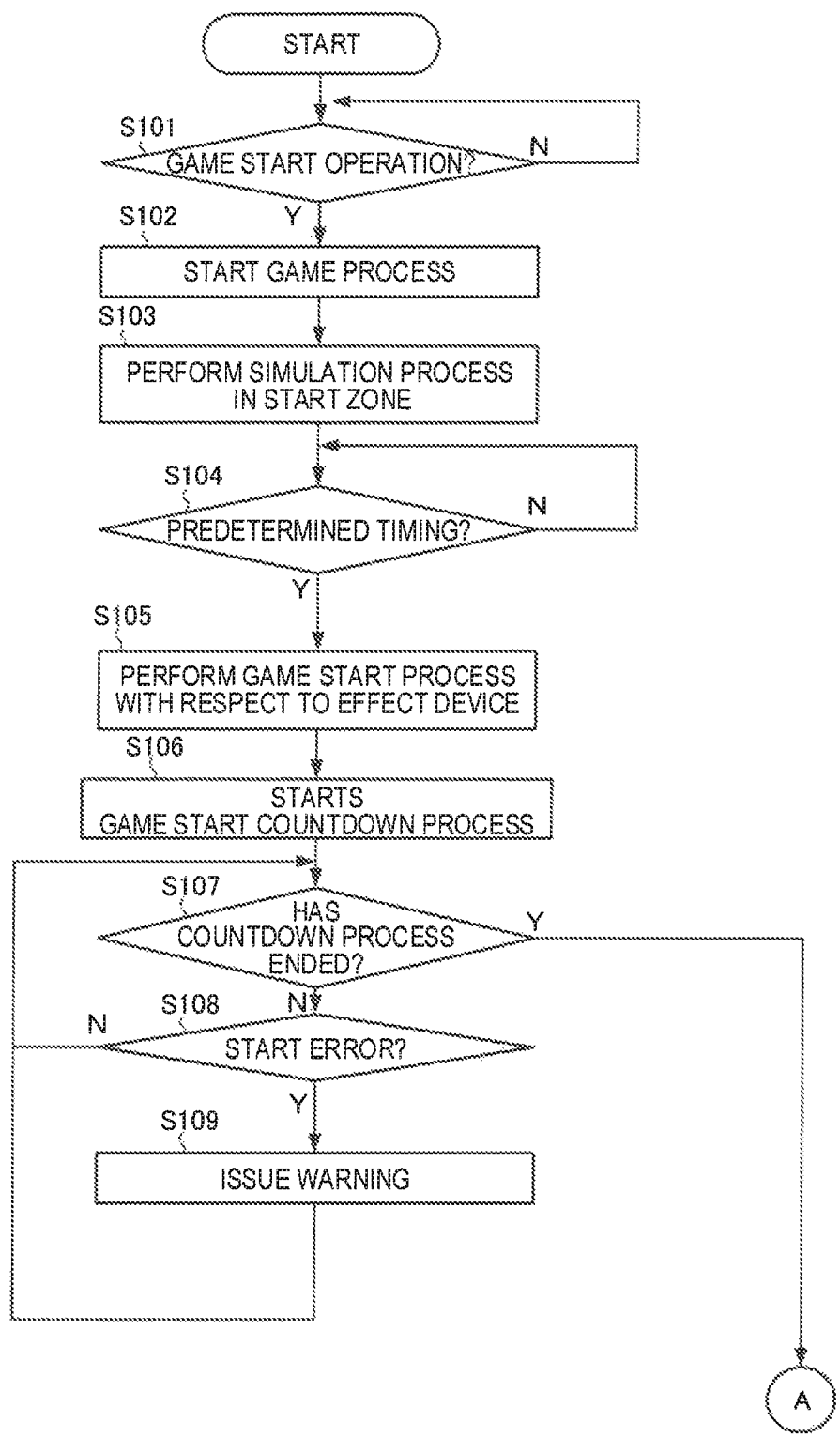
FIG. 8 is a flowchart illustrating the operation of a game system according to one embodiment of the invention.
Figure 9:
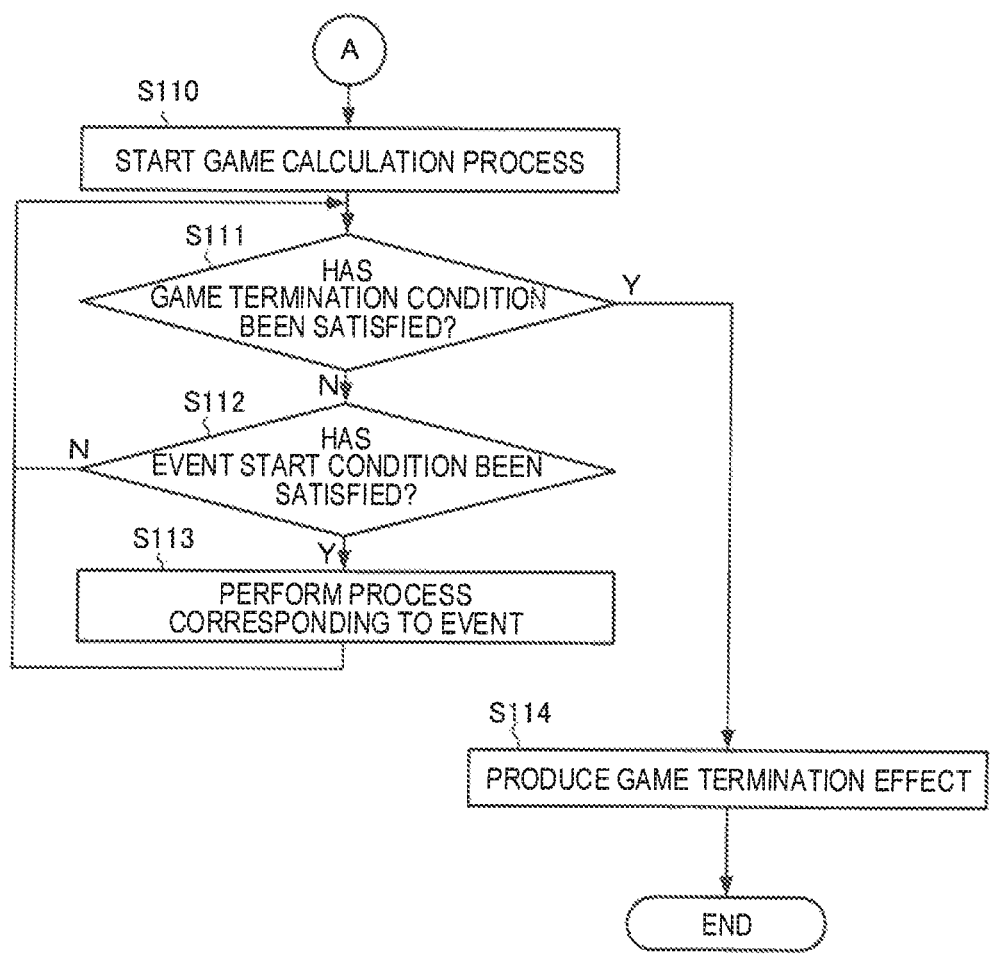
FIG. 9 is a flowchart illustrating the operation of a game system according to one embodiment of the invention.

The operation of the game system 1 is described below with reference to FIGS. 8 and 9. FIGS. 8 and 9 are flowcharts illustrating the operation of the game system 1.

Note that the operation of the game system 1 is described below taking an example in which the game system 1 implements a fear of heights experience game that allows the player P to experience a fear of heights. The fear of heights experience game is a game in which the player P starts from the start zone 13, moves along the moving path member 93 having a predetermined width, holds (rescues) the effect object 80 (e.g., cat) that is situated at the end point (i.e., a point situated away from the start zone 13) of the moving path member 93, and returns to the start zone 13 within the time limit.

The player P wears the HMD 20 and the fall prevention unit 40 (i.e., necessary hardware) before starting the game.

The game calculation section 110 detects whether or not a button (not illustrated in the drawings) has been pressed (i.e., whether or not the game has been started) based on an operation performed by the administrator on condition that the player P who wears the HMD 20 and the fall prevention unit 40 is situated at a predetermined position (i.e., within the start zone 13) (step S101).

In the step S101, the game calculation section 110 may detect whether or not the game has been started by detecting the player's state using the state detection processing section 112, and detecting whether or not the player P is situated at the predetermined position.

The game calculation section 110 performs various calculations with respect to the fear of heights experience game, and the object space setting section 111, the state detection processing section 112, the movement-motion processing section 113, the effect control processing section 114, the image generation section 130, and the sound generation section 140 perform the simulation process with respect to the fear of heights experience game (step S102).

More specifically, (1) the state detection processing section 112 starts to detect the marker units 60 provided to each part of the player P and the effect object 80, and. starts to detect the player's state and the state of the effect object 80, (2) the object space setting section 111 and the movement-motion processing section 113 start to generate the simulation space viewed from the player P corresponding to the player's state, the state of the effect object 80, the game environment, and the state of the game, (3) the effect control processing section 114 starts to control the corresponding effect device (blower 90, automatic door 91, and spring floor panel 92) corresponding to the player's state, the state of the effect object 80, the game environment, and the state of the game, and (4) the image generation section 130 and the sound generation section 140 respectively generate the simulation image and the sound corresponding to the player's state, the state of the effect object 80, the game environment, and the state of the game.

Note that each process in the step S102 is continuously performed until it is determined that the game has ended.

The image generation section 130 displays the image within the elevator on the HMD 20, and the effect control processing section 114 controls the spring floor panel 92 in the start zone 13, and performs the simulation process with respect to the start zone 13 (step S103).

When the effect control processing section 114 has detected a predetermined timing (i.e., the end of the simulation process in the start zone 13) (step S104), the effect control processing section 114 performs the game start process (step S105), and the game calculation section 110 starts the game start countdown process (step S106).

For example, the effect control processing section 114 (1) stops controlling the spring floor panel 92, (2) sets the automatic door 91 (i.e., elevator door) provided between the start zone 13 and the movement experience zone 14 from the closed state to the open state, and (3) performs the blowing process using the blower 90 (i.e., controls the corresponding effect device).

The game calculation section 110 detects whether or not the countdown process has ended (step S107), and the state detection processing section 112 performs a process that determines whether or not the player P has moved to the movement experience zone 14 from the start zone 13 (hereinafter referred to as "start error determination process") (step S108).

When the state detection processing section 112 has determined that the player P has moved to the movement experience zone 14 from the start zone 13 before the countdown process has ended, the state detection processing section 112 issues a warning using the HMD 20 (step S109), and performs the step S107.

Note that the state detection processing section 112 may performs the step S105 again after producing an effect (e.g., suspending the game start motion), or may suspend the game.

When the game calculation section 110 has detected that the countdown process has ended, the game calculation section 110 starts various calculations for implementing the fear of heights experience game (step S110). Specifically, the game calculation section 110 starts to perform the time limit count process, and starts the determination process with respect to the game termination process.

The game calculation section 110 determines whether or not the game termination condition has been satisfied (step S11). More specifically, the game calculation section 110 determines whether or not the player's state or the state of the effect object 80 has satisfied the termination condition in cooperation with the state detection processing section 112, and determines whether or not the time limit has been reached.

For example, the game calculation section 110 determines whether or not the specific state that satisfies the termination condition has occurred (e.g., whether or not the player P has run off the moving path R, or whether or not the effect object 80 to be rescued has fallen) based on the detected player's state.

When the game calculation section 110 has determined that the game termination condition has not been satisfied, the game calculation section 110 determines whether or not an event start condition has been satisfied in cooperation with the state detection processing section 112, or corresponding to the state of the game (step S112).

More specifically, the game calculation section 110 determines the event start condition (including whether or not the player is in the specific state) (e.g., whether or not the player has moved to the moving path member 93, whether or not the player has reached a first position (i.e., the position at which the cat object (effect object 80) was initially placed) of the moving path member 93, or whether or not the player has reached the position in the real space at which the cat object (effect object 80) was placed (i.e., the end point of the moving path member 93)).

When the game calculation section 110 has determined that the event start condition has been satisfied, the effect control processing, section 114, the image generation section 130, and the sound generation section 140 perform a process that corresponds to the detected event (step S113). When the game calculation section 110 has determined that the event start condition has not been satisfied, the step S111 is performed.

More specifically, (1) when it has been determined that the player P has moved to the moving path member 93 (i.e., the player P is in the specific state), the effect control processing section 114 operates the blower 90 disposed under the player P, and blows air toward the player P from the lower side. (2) When it has been determined that the player P has reached the first position (i.e., the position at which the cat object effect object 80) was initially placed) of the moving path member 93 (i.e., the player P is in the specific state), the image generation section 130 and the sound generation section 140 produce an effect in which the cat object runs away to the end point of the moving path R. (3) When it has been determined that the player P has reached the position at which the cat object was placed (i.e., the player P is in the specific state), the image generation section 130 and the sound generation section 140 produce an effect in which the cat object is rescued. (4) When it has been determined that the player P has rescued the cat object (i.e., the player P is in the specific state), the image generation section 130 and the sound generation section 140 produce an effect in which the width of the moving path member 93 is reduced when the moving direction coincides with the direction toward the start zone 13. (5) When it has been determined that the player P has reached the start zone 13 in a state in which the player P holds the cat object (i.e., the player P is in the specific state), the image generation section 130 and the sound generation section 140 produce a game-clear effect in which the player P escapes from the elevator.

When the game calculation section 110 has determined that the game termination condition has been satisfied, the image generation section 130 and the sound generation section 140 generate and output an image and a sound for producing a game termination effect (step S114), and the game calculation section 110 terminates the process. A different effect is produced as the game termination effect corresponding to the game termination condition.

2-8. Eye Input
2-8-1 Outline of Eye Input

The game calculation section 110 included in the simulation control device 100 appropriately operates as a display processing section 110A, a measurement section 110B, a reception section 110C, a notification section 110D, and an execution section 110E according to the game program (i.e., simulation control program) stored (recorded) in the main storage section 172, and functions as a user interface that utilizes an eye input. The term "eye input" used herein refers to an input performed by the player P when the player P has input an instruction to the simulation control device 100 by gazing at the object. An outline of the operation performed by the display processing section 110A, the measurement section 110B, the reception section 110C, the notification section 110D, and the execution section 110E with respect to the eye input is described below.

(1) Display Processing Section 110A

The display processing section 110A displays the virtual three-dimensional space (reference sign OBS in FIG. 10) on the HMD 20. For example, the display processing section 110A controls the object space setting section 111 and the image generation section 130, and places various objects for forming the simulation space in the virtual three-dimensional space (reference sign OBS in FIG. 10). The objects include an icon (push button objects OB1 to OB4 described later), a virtual controller, a virtual mechanical switch, a character, an item, and the like. The display processing section 110A performs a process that controls the image generation section 130, sets virtual camera within the virtual three-dimensional space OBS, and generates image data that allows the player P to view an image within the field-of-view range (reference sign DA in FIG. 10) of the virtual camera. The display processing section 110A performs a process that controls the communication control section 120 and the communication section 196, and outputs the image data to the HMD 20. The display processing section 110A also performs a process that changes the position and the attitude of the virtual camera in the virtual three-dimensional space (reference sign OBS in FIG. 10) corresponding to a change in the position and the attitude of the head of the player P that has been detected by the state detection processing section 112.

(2) Measurement Section 110B

Figure 10:
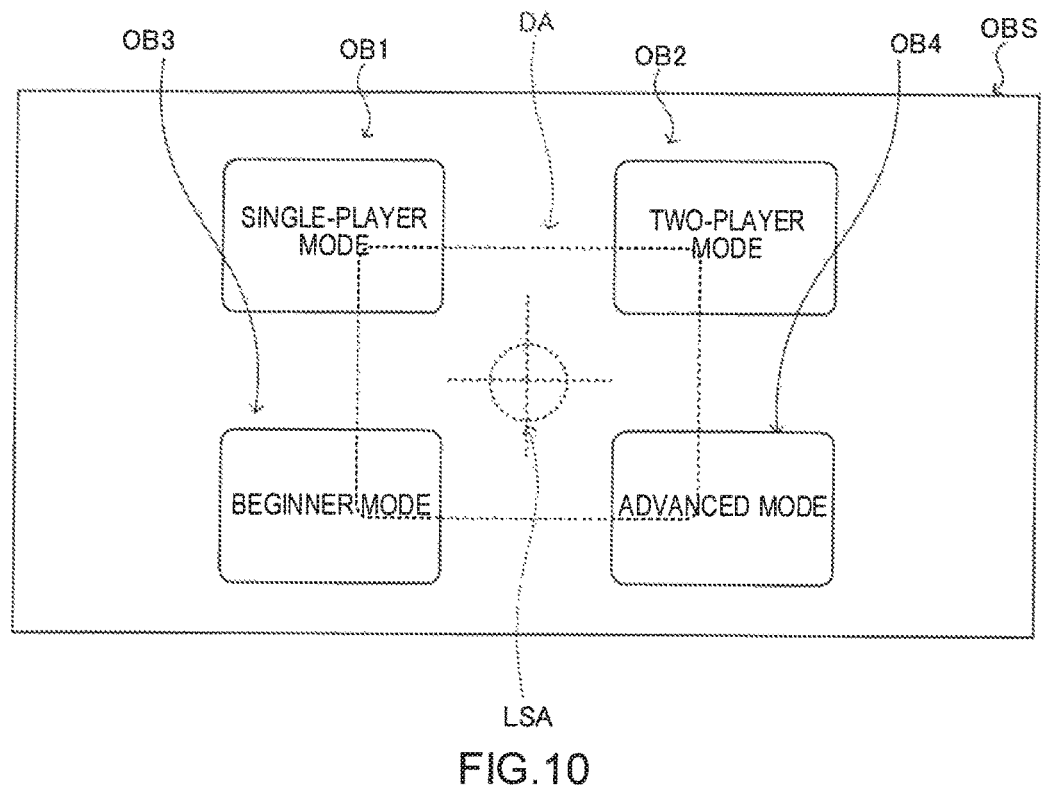
FIG. 10 illustrates the relationship with respect to a virtual three-dimensional space, a line-of-sight area with respect to a player P, and a space that is viewed from the player P (an example in which the line-of-sight area is situated at the center of the virtual three-dimensional space).
Figure 11:
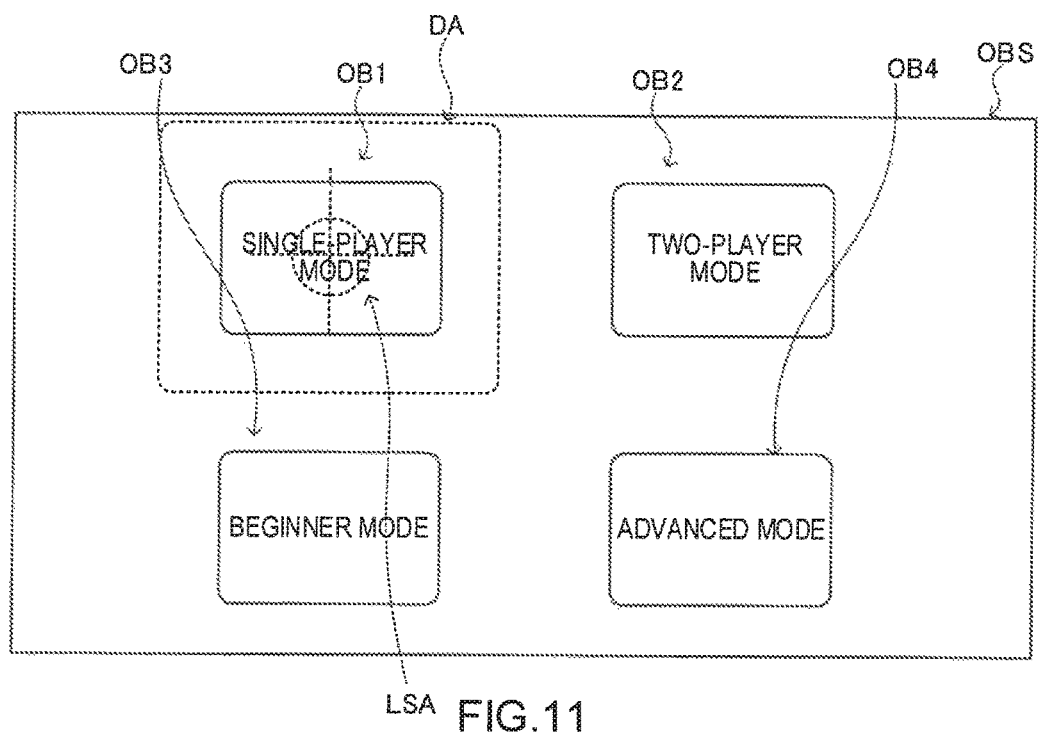
FIG. 11 illustrates the relationship with respect to a virtual three-dimensional space, a line-of-sight area with respect to a player P, and a space that is viewed from the player P (an example in which the line-of-sight area is situated in the upper left area of the virtual three-dimensional space).

The measurement section 110B measures the gaze time of the player P with respect to the object (reference sign OB1 in FIG. 11, for example) that is placed in the virtual three-dimensional space (reference sign OBS in FIG. 11). When the line of sight (reference sign LSA in FIG. 10) of the player P has been moved so as not to intersect the object (reference sign OB1 in FIG. 11), the measurement section 110B decreases the measured value (hereinafter referred to as "charge amount") corresponding to the time in which the line of sight (reference sign LSA in FIG. 10) of the player P does not intersect the object. The measurement section 110B performs a process (gaze determination process) that determines whether or not the player P is gazing at the push button object OB1 based on the positional relationship between a hit area OBHA (i.e., an area that is considered to include an object) with respect to the push button object OB1 that is situated in the display area DA, and a line-of-sight area LSA (i.e., an area that is considered to intersect a line of sight) that is set to the display area DA, for example.

(3) Reception Section 110C

The reception section 110C determines that the object (reference sign OB1 in FIG. 11) has been selected (locked) when the charge amount has reached a first threshold value Th1 (e.g., 2 seconds), determines that the lock with respect to the object (reference sign OB1 in FIG. 11) has been confirmed when the charge amount has reached a second threshold value Th2 (e.g., 5 seconds) that is larger than the first threshold value Th1, and determines that the lock with respect to the object (reference sign OBI in FIG. 11) has been canceled when the charge amount has decreased to a third threshold value Th3 (e.g., 0 seconds) before the lock with respect to the object is confirmed. Note that the reception section 110C may determine that the lock with respect to the object has been confirmed even when the charge amount has not reached the second threshold value Th2 (e.g., 5 seconds), on condition that the charge amount has exceeded the first threshold value Th1, and the player P has made a predetermined action. The predetermined action may be an action that presses a button provided in the real space, or may be an action that gazes at a confirmation object. Note that an example in which a button provided in the real space and a confirmation object are not used, is described below.

(4) Notification Section 110D

The notification section 110D notifies the player P of the magnitude of the charge amount. The notification section 110D controls the object space setting section 111, and notifies the player P of the magnitude of the charge amount by providing a visual effect that changes corresponding to the magnitude of the charge amount (FIG. 14) to the object (reference sign OB1 in FIG. 11), for example. Note that the notification section 110D may notify the player P of the magnitude of the charge amount by causing the sound generation section 140 to generate an effect sound, and outputting the effect sound to the headphone 61 of the HMD 20 through the communication control section 120 and the communication section 196. The notification section 110D may notify the player P of the magnitude of the charge amount by utilizing at least one of the sense of sight, the sense of hearing, the sense of touch, and the sense of smell of the player P. Note that an example in which the notification section 110D notifies the player P of the magnitude of the charge amount by utilizing the sense of sight of the player P is mainly described below.

(5) Execution Section 110E

The game calculation section 110 that functions as the execution section 110E performs a predetermined process that is linked to the object (reference sign OB1 in FIG. 11) when the lock with respect to the object (reference sign OB1 in FIG. 11) has been confirmed. The predetermined process that is linked to the object (reference sign OB1 in FIG. 11) is a process that sets a game parameter, a process that attacks the object, a process that moves the object, a process that is performed on another object, or a process that executes a predetermined program, for example. The execution section 110E may perform the predetermined process at a timing immediately after the lock with respect to the object has been confirmed, or may perform the predetermined process when a predetermined time has elapsed after the lock with respect to the object has been confirmed. Note that the following description is given taking an example in which the execution section 110E performs the predetermined process at a timing immediately after the lock with respect to the object has been confirmed.

The following description is given taking an example in which the operation of the display processing section 110A, the operation of the measurement section 110B, the operation of the reception section 110C, the operation of the notification section 110D, and the operation of the execution section 110E, are implemented by the game calculation section 110.

2-8-2. Line-of-Sight Area

FIG. 10 illustrates the relationship with respect to the virtual three-dimensional space OBS, a space (area) that is viewed from the player P who wears the HMD 20 (hereinafter referred to as "display area DA"), and the line-of-sight area LSA with respect to the player P who wears the HMD 20.

The display area DA corresponds to the field-of-view range of the virtual camera that is placed in the virtual three-dimensional space OS (see above), and is an area that is displayed to the player P through the HMD 20. Since the game calculation section 110 causes the position and the attitude of the virtual camera to follow the position and the attitude of the head of the player P (see above), the position and the attitude of the display area DA in the virtual three-dimensional space OBS also follow the position and the attitude of the head of the player P.

The line-of-sight area LSA is an area having a predetermined size that has been set by the game calculation section 110 at the center of the display area DA. The line-of-sight area LS corresponds to a range (gaze range or line-of-sight range) that is considered to be gazed at by the player P during the gaze determination process described later. The ratio of the size of the line-of-sight area LSA with respect to the size of the display area DA is basically fixed, and the position of the line-of-sight area LSA within the display area. DA is also basically fixed. For example, the line-of-sight area LSA is provided at the center of the display area DA, and has a circular shape (see FIG. 10).

Note that the ratio of the size of the line-of-sight area LSA with respect to the size of the display area DA may be set to be variable. The position of the line-of-sight area LSA within the display area DA may also set to be variable. When the position of the line-of-sight area LSA within the display area DA is set to be variable, the position of the line-of-sight area LSA may be changed to follow the direction of the line of sight of the player P (see the line of sight input described later). Although FIG. 10 illustrates an example in which the contour and the center coordinates of the line-of-sight area LSA are displayed, the contour and the center coordinates of the line-of-sight area LSA may not be displayed.

FIG. 10 illustrates an example in which a selection screen is displayed as the virtual three-dimensional space OBS when the fear of heights experience game has been started (step S101). The selection screen is a screen for the player P to perform several settings with respect to the game process.

FIG. 10 illustrates an example in which push button objects OB1 and OB2 for selecting the number of players, and push button objects OB3 and OB4 for selecting the difficulty level, are displayed within the selection screen at specific intervals. Each of the push button objects OB1, OB2, OB3, and OB4 is an object that represents a virtual operation button, and may be referred to as "icon". An additional object (e.g., a scenery that is viewed from the start point of the fear of heights experience game) (not illustrated in FIG. 10) that is situated in the virtual three-dimensional space OBS may be displayed behind the push button objects OB1, OB2, OB3, and OB4 with respect to the player P.

A function of setting the mode of the game process that is performed by the processing section 101 (mainly the game calculation section 110) to "single-player mode" is assigned to the push button object OB1. The single-player mode is a mode that is suitable when a single player P who wears the HMD 20 moves within the structure 10.

A function of setting the mode of the game process that is performed by the processing section 101 (mainly the game calculation section 110) to "two-player mode" is assigned to the push button object OB2. The two-player mode is a mode that is suitable when two players P who wear the HMD 20 move within an identical structure 10 (i.e., a mode that allows two players P to share the experience of fear). When the mode has been set to the two-player mode, the game calculation section 110 sets two virtual cameras that respectively correspond to two players P within the virtual three-dimensional space OBS, and places two characters (avatars) that respectively correspond to the two players P within the virtual three-dimensional space OBS, for example. The game calculation section 110 links the two virtual cameras to the heads of the two players P, and links each part of the two avatars to each part of the two players P.

A function of setting the mode of the game process that is performed by the processing section 101 (mainly the game calculation section 110) to "beginner mode" is assigned to the push button object OB3. The beginner mode is a mode in which the difficulty level of the game process (e.g., the probability that the player P falls) is set to be lower than that of the advanced mode described below. The difficulty level of the game process is adjusted by adjusting the parameter of the game process, for example.

A function of setting the mode of the game process that is performed by the processing section 101 (mainly the game calculation section 110) to "advanced mode" is assigned to the push button object OB4. The advanced mode is a mode in which the difficulty level of the game process (e.g., the probability that the player P falls) is set to be higher than that of the beginner mode (see above). The difficulty level of the game process is adjusted by adjusting the parameter of the game process, for example.

The following description is given on the assumption that the player P plays the game in the single-player mode and the beginner mode (i.e., the player P locks the push button objects OB1 and OB3 by performing an eye input, and confirms the lock with respect to the push button objects OB1 and OB3 by performing an eye input).

As illustrated in FIG. 10, the push button objects OB1, OB2, OB3, and OB4 are placed in a 2×2 matrix, and the display area DA and the line-of-sight area LSA are situated at the center of the matrix when the selection screen has been displayed, for example.

When the player P has turned his/her head to the upper left, the display area. DA and the line-of-sight area LSA move to the upper left area of the selection screen (with respect to the player P) (see FIG. 11).

FIG. 11 illustrates a state in which the line-of-sight area LSA is situated at the center of the push button object OB1, and the display area DA covers the entirety of the push button object OB1. In this case, the game calculation section 110 determines that the player P is gazing at the push button object OB1. Note that the details of the gaze determination process are described later.

When the player P has moved backward, the size of the display area DA and the line-of-sight area LSA within the virtual three-dimensional space OBS increases, and the entirety of the push button objects OB1, OB2, OB3, and OB4 can be displayed within the display area DA (not illustrated in FIGS. 10 and 11), for example.

2-8-3. Gaze Determination Process

Figure 12A:
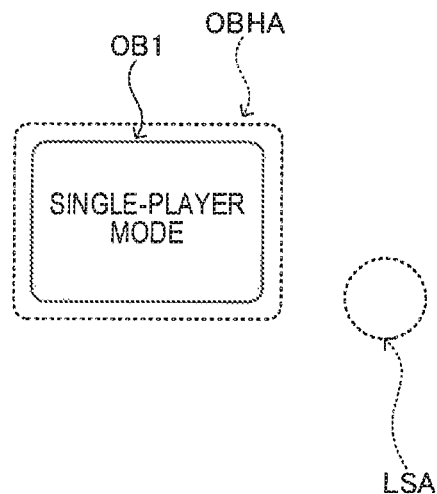
FIGS. 12A and 12B illustrates the relationship between a hit area and a line-of-sight area.

The game calculation section 110 sets a hit area to each of the push button objects OB1, OB2, OB3, and OB4 that are displayed (placed) within the selection screen. FIG. 12A illustrates an example of a hit area OBHA that is set to the push button object OBI.

As illustrated in FIG. 12A, the hit area OBHA that is set to the push button object OB1 is an area that has a predetermined shape and a predetermined size, and has the same center coordinates as those of the push button object OB1. The shape of the contour of the hit area OBHA is similar to that of the push button object OB1, for example. The size of the hit area OBHA that is set to the push button object OB1 is almost equal to the size of the push button object OB1, for example.

Note that the size of the hit area OBHA may be larger than the size of the push button object OB1, or may be smaller than the size of the push button object OB1. The size of the hit area OBHA may be adjustable.

The game calculation section 110 determines whether or not the player P is gazing at the push button object OB1 based on the positional relationship between the hit area OBHA that is set to the push button object OB1 and the line-of-sight area LSA (gaze determination process).

Figure 12B:
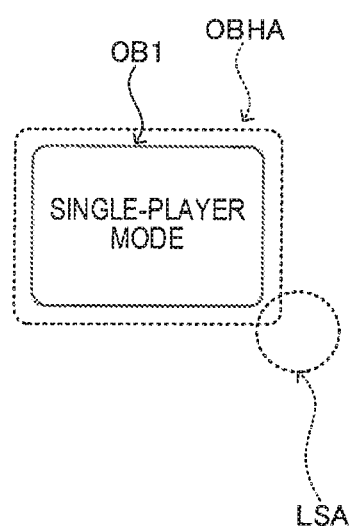

For example, the game calculation section 110 determines that the player P is gazing at the push button object OB1 when at least part of the hit area OBHA and at least part of the line-of-sight area LSA overlap each other, and determines that the player P is not gazing at the push button object OB1 (i.e., the line of sight of the player P does not intersect the push button object OB1) when the hit area OBHA and the line-of-sight area LSA do not overlap each other. FIG. 12B illustrates a state in which at least part of the hit area OBHA and at least part of the line-of-sight area LSA overlap each other. The game calculation section 110 determines that the player P is gazing at the push button object OB1 when the state illustrated in FIG. 12B has occurred.

Although an example in which the game calculation section 110 determines that the player P is gazing at the push button object OB1 when at least part of the hit area OBHA and at least part of the line-of-sight area LSA overlap each other, has been described above, the game calculation section 110 may determine that the player P is gazing at the push button object OB1 when one of the hit area OBHA and the line-of-sight area LSA is included in the other of the hit area OBHA and the line-of-sight area LSA, or when the interval between the hit area OBHA and the line-of-sight area LSA has become less than a threshold value, for example.

Although FIGS. 12A and 12B illustrate an example in which the line-of-sight area LSA is smaller than the hit area OBHA, the line-of-sight area LSA may be larger than the hit area OBHA.

The player P can change the position of the line-of-sight area LSA within the virtual three-dimensional space OBS, and gaze at the push button object OB1, or move the line of sight so as not intersect the push button object OB1, by changing the attitude and the position of the head on which the HMD 20 is worn, for example.

A state in which it has been determined by the gaze determination process that the player P is gazing at the push button object may be referred to as "gaze" or the like, and a state in which it has been determined by the gaze determination process that the player P is not gazing at the push button object may be referred to as "gaze has been removed" or the like. The term "line of sight" used herein may not refer to the actual line of sight (i.e., the visual axis of the eyeball) of the player P in the real space, but may refer to the line-of-sight area LSA within the virtual three-dimensional space OBS.

The line-of-sight area LSA and the hit area OBHA basically may not be displayed on the HMD 20. Specifically, since the game calculation section 110 enhances the gazed object when the player P has gazed at an arbitrary object within the virtual three-dimensional space OBS (see FIG. 14 described later, for example), it is considered that the player P does not lose the position of the line of sight within the virtual three-dimensional space OBS even when the line-of-sight area LSA and the hit area OBHA are not displayed.

2-9. Charge Amount with Respect to Gaze Time

The game calculation section 110 basically measures (charges) the gaze time of the player P with respect to each object placed in the virtual three-dimensional space OBS, and controls the state of the object between the locked state, the unlocked state, and the confirmed state corresponding to the measured amount (charge amount) with respect to each object. The game calculation section 110 manages the charge amount with respect to the gaze time with respect to each object using a read-write memory (e.g., data buffer 176), FIGS. 13A, 13B, 13C, and 13D are graphs illustrating the relationship between the elapsed time (from the start of gaze) and the charge amount with respect to one object. The horizontal axis indicates time, and the vertical axis indicates the charge amount.

Figure 13A:
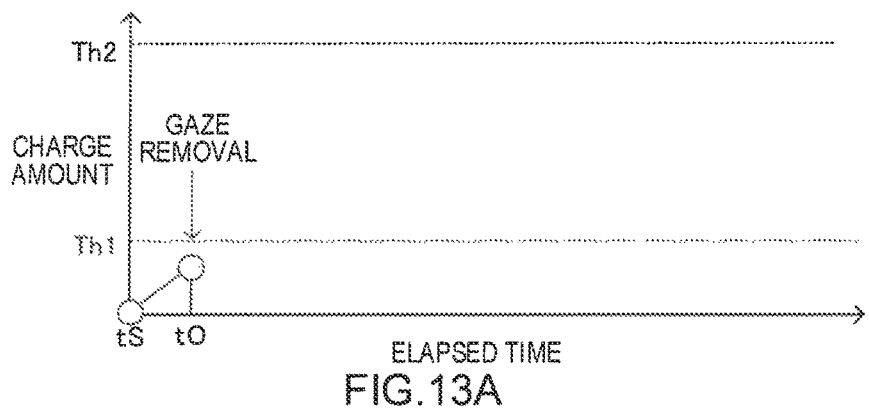
FIGS. 13A to 13D illustrates the relationship between an elapsed time from the start of gaze, and a charge amount with respect to a gaze time.

FIG. 13A illustrates the change pattern of the charge amount when the player P gazed at the object for a short time (i.e., when the player P removed his/her gaze from the object before the charge amount reaches the first threshold value Th1).

Figure 13B:
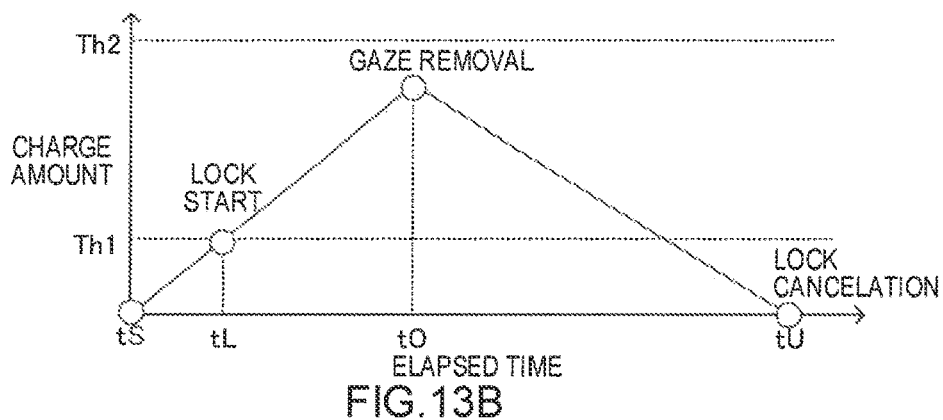

FIG. 13B illustrates the change pattern of the charge amount when the player P gazed at the object for a certain time, and then removed his/her gaze from the object (i.e., when the player P removed his/her gaze from the object after the charge amount had reached the first threshold value Th1).

Figure 13C:
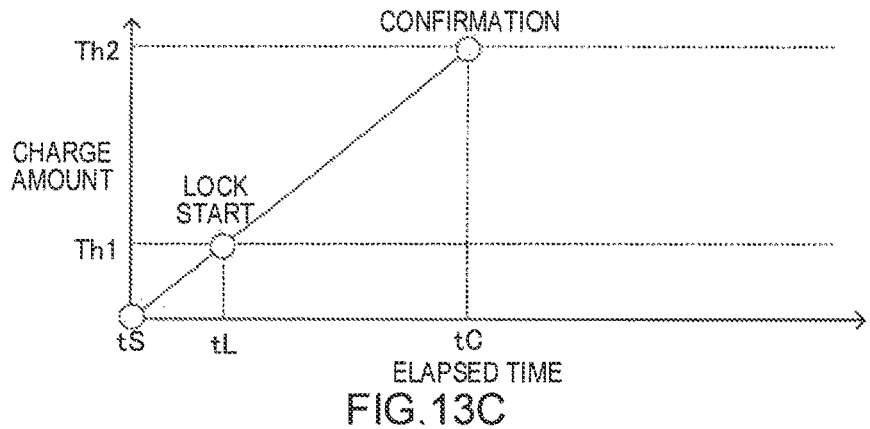

FIG. 13C illustrates the change pattern of the charge amount When the player P continuously gazed at the object for a sufficient time (i.e., when the charge amount reached the second threshold value Th2).

Figure 13D:
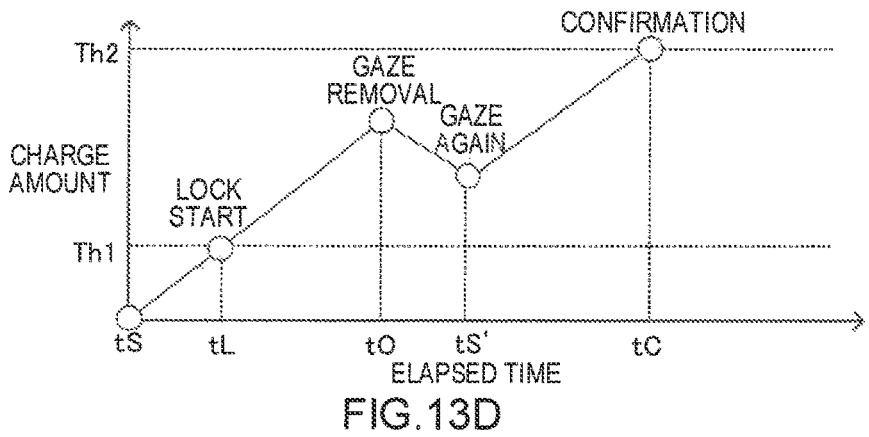

FIG. 13D illustrates the change pattern of the charge amount when the player P gazed at the object for a certain time, temporarily removed his/her gaze from the object, and gazed at the object again (i.e., when the player P removed his/her gaze from the object after the charge amount had exceeded the first threshold value Th1, but before the charge amount reaches the second threshold value Th2, and gazed at the object again before the charge amount reaches "0"). When the player P has gazed at an arbitrary object (see the charge start time is in FIGS. 13A to 13D), the game calculation section 110 charges the gaze time with respect to the object. For example, the game calculation section 110 increases the charge amount by "1" each time the gaze time has increased by 1 second.

When the player P has removed his/her gaze from the object (see the gaze removal time tO in FIGS. 13B and 13D), the game calculation section 110 decreases the charge amount with respect to the gaze time corresponding to the time in which the player P does not gaze at the object. For example, the game calculation section 110 increases the charge amount by "0.5" each time the gaze time has increased by 1 second.

When the charge amount has reached the first threshold value Th1 (e.g., Th1=2), the game calculation section 110 determines that the object has been locked (see the lock start time tL in FIGS. 13B, 13C, and 13D).

Specifically, the player P can lock the object by continuously gazing at the object for a time equal to or longer than a specific time (e.g., 2 seconds).

When the charge amount has reached the second threshold value Th2 (e.g., Th2=5) that is larger than the first threshold value Th1 (see the confirmation time tC in FIGS. 13C and 13D), the game calculation section 110 determines that the lock with respect to the object has been confirmed, and resets the charge amount to "0".

Specifically, the player P can confirm the lock with respect to the object by continuously (or intermittently) gazing at the locked object for a time equal to or longer than a specific time.

When the charge amount has decreased to the third threshold value Th3 (e.g., TH3=0) after the object has been locked, but before the lock with respect to the object is confirmed, the game calculation section 110 determines that the lock with respect to the object has been canceled (see the lock cancelation time tU in FIG. 13B).

Specifically, the player P can cancel the lock with respect to the object by removing his/her gaze from the locked object for a time equal to or longer than a specific time. Moreover, the lock with respect to the object can be canceled at an earlier timing as the gaze time with respect to the object decreases. On the other hand, the player P can increase the time in which the lock with respect to the object is maintained after the player P has removed his/her gaze from the locked object by gazing at the locked object for a long time. In other words, the degree by which the player P desires to gaze at the object is reflected in the degree of lock (i.e., the difficulty level with respect to cancelation of the lock).

When the player P has removed his/her gaze from the object before the charge amount reaches the first threshold value Th1 (see the gaze removal time tO in FIG. 13A), the game calculation section 110 (immediately) resets the charge amount to "0".

Specifically, the object is not locked when the player P has merely glanced at the object (e.g., when the player P has not decided the object to be locked), and the object is locked only when the player P has intentionally gazed at the object to be locked (for a long time).

The game calculation section 110 decreases the speed at which the charge amount approaches the third threshold value Th3 after the object has been locked, to be lower than the speed at which the charge amount approaches the second threshold value Th2. For example, the game calculation section 110 increases the charge amount by "1" each time the gaze time has increased by 1 second, and decreases the charge amount by "0.5" each time the time in which the player P does not gaze at the locked object has increased by 1 second. As illustrated in FIGS. 13B and 13D, the slope of the curve along which the charge amount decreases is less steep than that of the curve along which the charge amount increases.

Specifically, the player P can easily maintain the lock with respect to the object after the object has been locked without completely maintaining the position and the attitude of the head.

The player P can confirm the lock with respect to the desired object within a short time by continuously gazing at the desired object without hesitation (see FIG. 13C). When the player P hesitates to confirm the lock with respect to the object, the player P can increase the remaining time until the lock with respect to the object is confirmed, by removing his/her gaze from the object, and gazing at the object again (see FIG. 13D).

As described above, the player P can arbitrarily switch the state of the object between the locked state, the unlocked state, and the confirmed state.

Although an example in which the game calculation section 110 adjusts the speed at which the charge amount is increased or decreased in order to adjust the speed at which the charge amount approaches the threshold value, has been described above, the game calculation section 110 may adjust the threshold value instead of (or in addition to) adjusting the speed at which the charge amount is increased or decreased. Specifically, since the charge amount and the threshold value are relative values, the adjustment of the speed at which the charge amount is increased or decreased is considered to be equivalent to the adjustment of the threshold value with respect to the charge amount (hereinafter the same).

Although an example in which the game calculation section 110 determines that the lock with respect to the object has been canceled at a timing at which the charge amount with respect to the object has reached the threshold value Th3, has been described above, the game calculation section 110 may determine that the lock with respect to the object has been canceled when the player P has made a predetermined action even when the charge amount with respect to the object has not reached the threshold value Th3. The predetermined action may be an action that presses a button provided in the real space, or may be an action that gazes at a cancelation object, or may be an action that gazes at the object again (described later). Note that an example in which a button provided in the real space for cancelling a lock, a cancelation object, and an action that gazes at the object again are not used, is described below.

2-10. Visual Effect with Respect to Object

Figure 14:
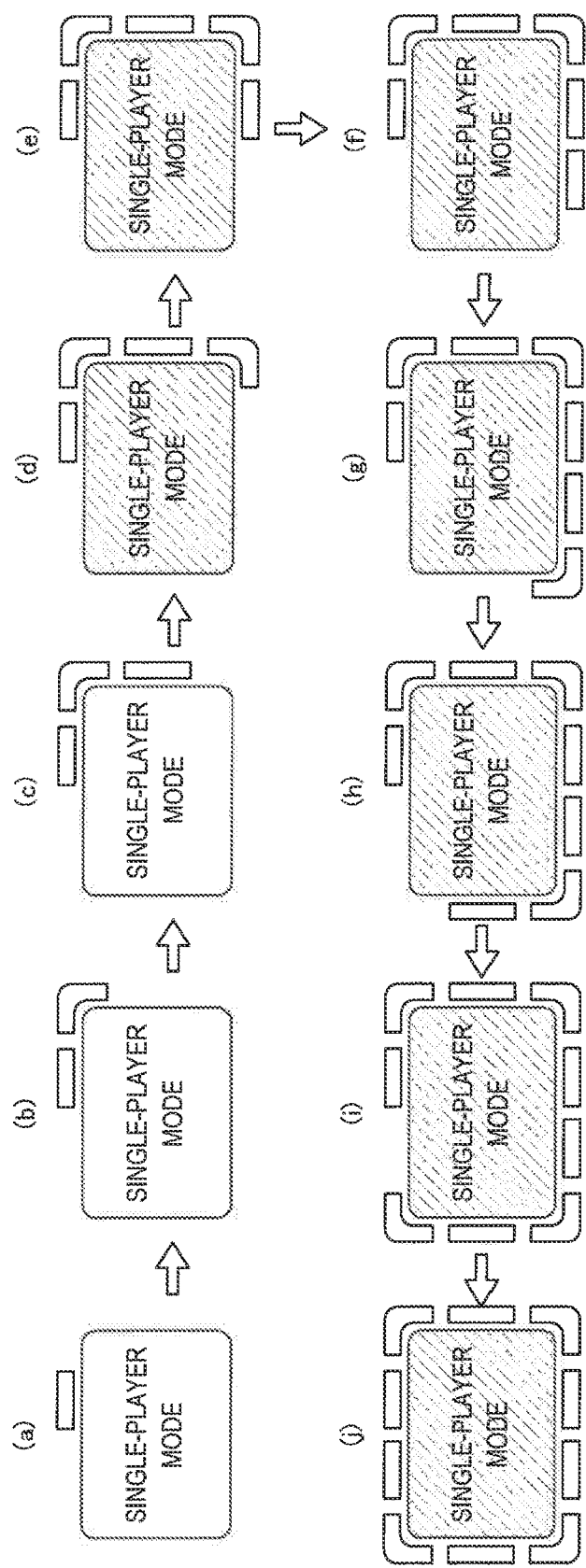
FIG. 14 illustrates an example of a visual effect with respect to an object.

FIG. 14 illustrates an example of a visual effect applied to the object.

The game calculation section 110 visualizes a temporal change in the charge amount with respect to the object (i.e., a state in which the charge amount increases and decreases) by providing a visual effect to the object, and changing the visual effect corresponding to the charge amount with respect to the object (see FIG. 14).

When the charge amount with respect to each object is visualized, the player P can determine the object at which the player P gazes, and determine whether or not the player P is gazing at the desired object. The player P can also determine the remaining time until the object at which the player P gazes is locked, the remaining time until the lock with respect to the object is canceled, and the gaze time required for the lock with respect to the object to be confirmed.

The visual effect is implemented by an animation, for example. It is possible to notify the player P of a temporal change in charge amount in real time (successively) by utilizing an animation. In the example illustrated in FIG. 14, the animation is designed so that a line of marks (i.e., a line of neon marks) is placed around the outer edge of the object, and the number of marks that form a line is changed corresponding to the charge amount.

When the charge amount is thus reflected in the number of marks that form a line, the player P can intuitively determine the magnitude of the charge amount, whether the charge amount has increased or decreased, the speed at which the charge amount increases, the speed at which the charge amount decreases, and the like.

(a) in FIG. 14 illustrates a line of marks when the charge amount has reached "0.5" after the player P has started gazing at the object (immediately after the player P has started gazing at the object, or immediately before the lock with respect to the object is canceled).

(b) in FIG. 14 illustrates a line of marks when the charge amount has reached "1" after the player P has started gazing at the object.

(c) in FIG. 14 illustrates a line of marks when the charge amount has reached "1.5" after the player P has started gazing at the object.

(d) in FIG. 14 illustrates a line of marks when the charge amount has reached "2" (i.e., when the object has been locked) after the player P has started gazing at the object.

(e) in FIG. 14 illustrates a line of marks when the charge amount has reached "2.5" after the object has been locked.

(f) in FIG. 14 illustrates a line of marks when the charge amount has reached "3" after the object has been locked.

(g) in FIG. 14 illustrates a line of marks when the charge amount has reached "3.5" after the object has been locked.

(h) in FIG. 14 illustrates a line of marks when the charge amount has reached "4" after the object has been locked.

(i) in FIG. 14 illustrates a line of marks when the charge amount has reached "4.5" after the object has been locked.

(j) in FIG. 14 illustrates a line of marks when the charge amount has reached "5" (i.e., when the lock with respect to the object has been confirmed) after the object has been locked.

Specifically, the animation illustrated in FIG. 14 represents the charge amount using the number of marks that form a line. Each white arrow illustrated in FIG. 14 indicates the direction in which a change in line of marks occurs when the player P has continuously gazed at the object for 5 seconds. When the player P has removed his/her gaze from the object, a change in the line of marks occurs in the direction opposite to the direction indicated by each white arrow since the charge amount decreases. In one embodiment of the invention, since the speed at which the charge amount decreases is lower than the speed at which the charge amount increases (see above), the speed at which the animation changes in the direction opposite to the direction indicated by each white arrow is lower than the speed at which the animation changes in the direction indicated by each white arrow (see FIG. 14).

The game calculation section 110 distinguishes the object that has been locked from the object that is not locked. For example, the game calculation section 110 sets the enhancement level with respect to the object that has been locked ((d) to (j) in FIG. 14) to be higher than the enhancement level with respect to the object that is not locked ((a) to (c) in FIG. 14). In the example illustrated in FIG. 14, the density of the object that has been locked ((d) to (j) in. FIG. 14) is set to be higher than the density of the object that is not locked ((a) to (c) in FIG. 14).

Therefore, the player P can determine whether or riot the object has been locked based on the enhancement level (e.g., density) with respect to the object.

Note that the enhancement level with respect to the object may be adjusted using at least one of the following parameters (1) to (14), for example.

Figure 26:
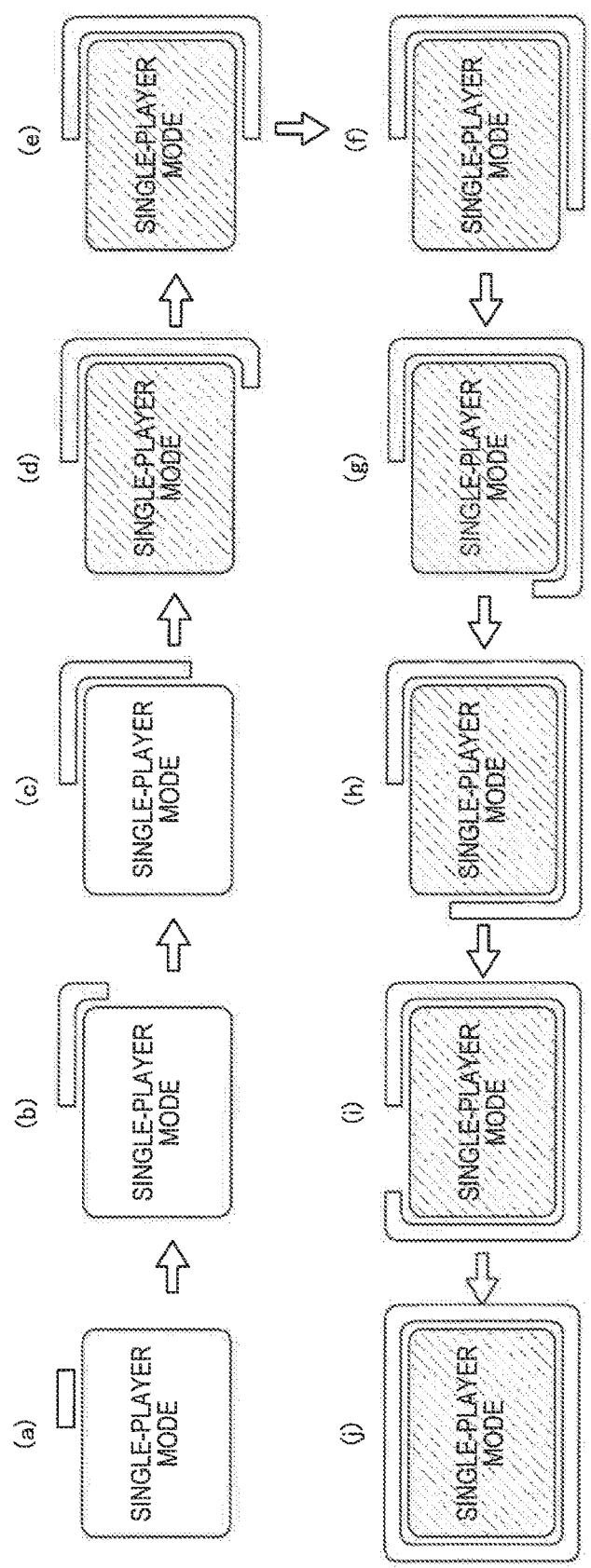
FIG. 26 illustrates a further example of a visual effect with respect to an object.

(1) Density of a line of marks
(2) Brightness of a line of marks
(3) Color of a line of marks
(4) Opacity of a line of marks
(5) Saturation of a line of marks
(6) Shape of a line of marks
(7) Change pattern of at least one of density, brightness, color, opacity, saturation, and shape of a line of marks
(8) Density of object
(9) Brightness of object
(10) Color of object
(11) Opacity of object
(12) Saturation of object
(13) Shape of object
(14) Change pattern of at least one of density, brightness, color, opacity, saturation, and shape of object Although an example in which the animation that notifies the player P of the charge amount is designed so that a line of marks is placed around the outer edge of the object, and the number of marks that form a line is changed corresponding to the charge amount, has been described above, the animation may be designed so that a ring-shaped or subring-shaped gauge (indicator) (tubular gauge) is placed around the outer edge of the object, and the length of the gauge (corresponding to the position of the pointer of the gauge) is changed corresponding to the charge amount (see FIG. 26).

When the charge amount is thus reflected in the length of the gauge, the player P can intuitively determine the magnitude of the charge amount, whether the charge amount has increased or decreased, the speed at which the charge amount increases, the speed at which the charge amount decreases, and the like.

Figure 19:
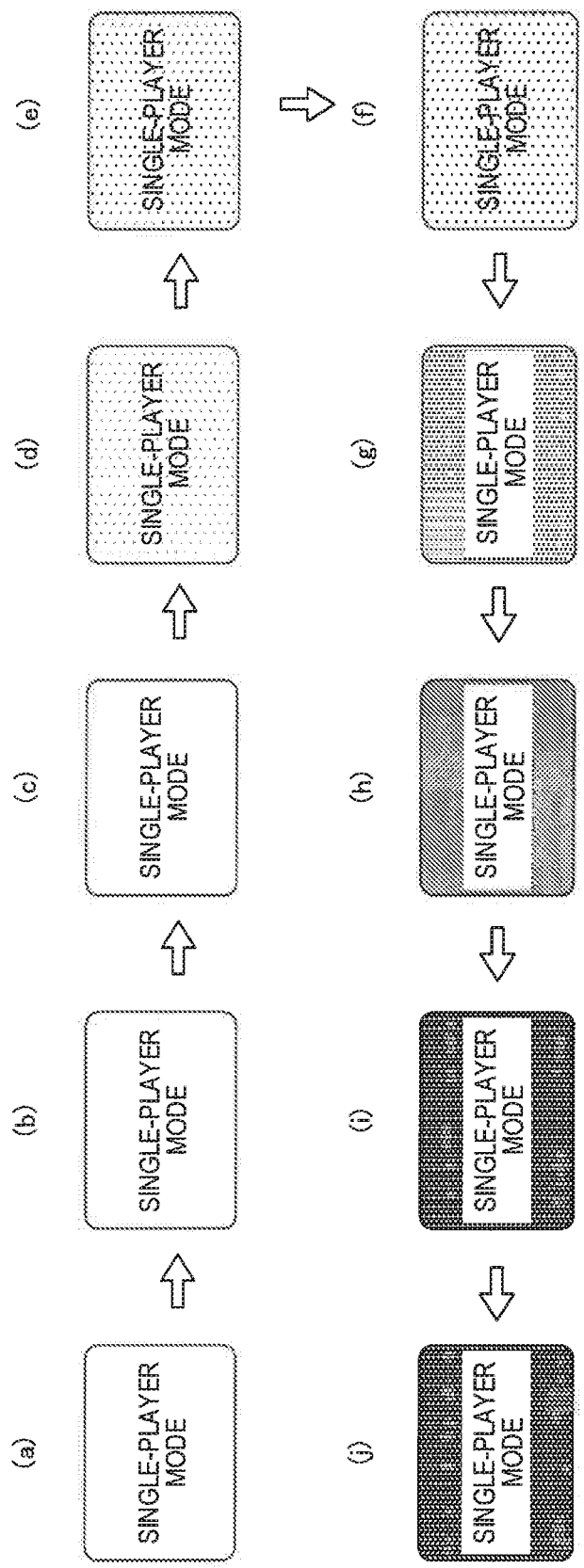
FIG. 19 illustrates another example of a visual effect with respect to an object.

The animation that notifies the player P of the charge amount may be designed so that the enhancement level with respect to the object is changed corresponding to the charge amount instead of using a line of marks or a gauge. The enhancement level with respect to the object may be adjusted using at least one of the parameters (7) to (12) (see above), for example. FIG. 19 illustrates an example in which the density of the object is changed corresponding to the charge amount.

When the player P is notified of the charge amount using a change in the enhancement level with respect to the object, it is possible to provide a sufficient space around the object, and improve the degree of freedom with respect to the layout of the object. This configuration is effective when a number of objects are closely placed, for example.

It is desirable that the enhancement level increase as the charge amount increases. An increase in enhancement level refers to an increase in density, an increase in saturation, an increase in opacity, an increase in color change cycle (color change), and the like.

2-11. Combo Process 2-11-1. Outline of Combo Process

The game calculation section 110 performs (implements) a combo process when a predetermined condition has been satisfied in a state in which two or more objects have been locked. The term "combo process" used herein refers to a process that receives an eye input (i.e., an eye input that confirms a lock, or an eye input that cancels a lock) with respect to all of two or more objects that have been locked based on a common charge amount.

The term "common charge amount" refers to a charge amount (integrated charge amount) that is obtained by integrating the charge amounts with respect to two or more objects, the charge amount (representative charge amount) with respect to an object that represents two or more objects, a new charge amount (separate charge amount) that is set separately from the charge amounts with respect to two or more objects, or the like. The term "integrated charge amount" refers to the average value of the charge amounts with respect to two or more objects, the weighted average value of the charge amounts with respect to two or more objects, the sum of the charge amounts with respect to two or more objects, a product of the charge amounts with respect to two or more objects, or the like. An example in which the sum of the charge amounts with respect to two or more objects is used as the integrated charge amount is mainly described below (the details thereof are described later).

When the player P desires to implement the combo process, the player P locks one object, locks another object before the lock with respect to the one object is canceled so that two or more objects are locked at the same time, and satisfies a predetermined condition (hereinafter referred to as "combo implementation condition"), The details of the combo implementation condition are described later.

When the combo process has started, the player P can confirm the lock with respect to two or more objects by performing one eye input. Therefore, it suffices for the player P to perform an eye input (mainly a head turn motion in one embodiment of the invention) a reduced number of times as compared with the case where the player P performs an eye input corresponding to each of two or more objects.

For example, when the combo process has started in a state in which the push button objects OB1 and OB2 (see FIG. 10) have been locked, the player P can input an instruction that confirms the lock with respect to the push button objects OB1 and OB2 (i.e., an instruction that designates the single-player mode and the beginner mode) to the simulation control device 100 by performing an eye input with respect to only one of the push button objects OB1 and OB2.

2-11-2. Combo Implementation Condition

The combo implementation condition is described in detail below.

The game calculation section 110 uses a condition whereby an object included in two or more locked objects that has been locked earlier than the other(s) has been gazed at by the player P again, as the combo implementation condition.

An example in which the combo process is performed with respect to the push button objects OB1 and OB3 (see (a) in FIG. 15), is described below. Although an example in which the combo process is performed with respect to two objects is described below, the combo process may be performed with respect to three or more objects.

The player P gazes at one (e.g., push button object OB1) of the push button objects OB1 and OB3 for a sufficient time equal to or longer than 2 seconds to lock the push button object OB1. The sufficient time is longer than 2 seconds and shorter than 5 seconds, for example.

The player P then removes his/her gaze from the locked push button object OB1, and gazes at the push button object OB3 for a time equal to or longer than 2 seconds before the lock with respect to the push button object OB1 is canceled to lock the push button object OB3. The push button objects OB1 and OB3 are thus locked.

The player P then removes his/her gaze from the locked push button object OB3, and gazes at the push button object OB1 again before the lock with respect to the push button objects OB1 and OB3 is canceled. The curve indicated by the thick dotted arrow illustrated in FIG. 15 (see (a)) indicates an example of the moving path of the line of sight of the player P. The combo implementation condition is thus satisfied with respect to the push button objects OB1 and OB3, and the combo process is performed.

When one push button object has been locked, the lock with respect to the one push button object is not immediately canceled even when the player P has removed his/her gaze from the one push button object. Therefore, the player P can lock another object before the lock with respect to the one push button object is canceled. Accordingly, the player P can easily satisfy the combo implementation condition.

Note that the game calculation section 110 may decrease the speed at which the charge amount with respect to the object that is not locked approaches the first threshold value Th1, as the charge amount (or the total charge amount) with respect to the object that has been locked increases.

In this case, since the object that is not locked is not easily locked when the player P has gazed at the object that has been locked for a long time, the player P can determine whether or not to implement the combo process, and determine whether or not to lock two or more objects by gazing at the object to be locked for a long time when it is desired not to implement the combo process, or increase the number of objects to be locked, and gazing at the object to be locked for a short time when it is desired to implement the combo process, or increase the number of objects to be locked, for example.

2-11-3. Visual Effect Before and After Implementation of Combo Process

A visual effect before and after the implementation of the combo process is described below.

The game calculation section 110 changes the visual effect with respect to two or more locked objects (OB1 and OB3) depending on whether or not the combo process has been started.

Figure 15:
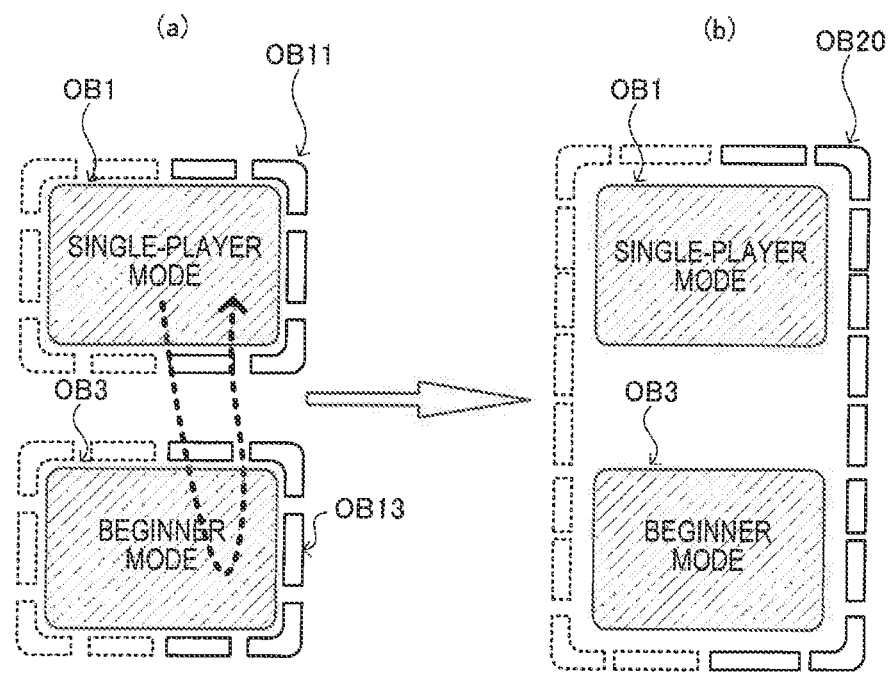
FIG. 15 illustrates a change in visual effect with respect to implementation of a combo process.

(a) in FIG. 15 illustrates an example of the visual effect before the combo process is started, and (b) in FIG. 15 illustrates an example of the visual effect after the combo process has been started. FIG. 15 ((a) and (b)) illustrates an example in which a line of marks is used as the visual effect. Note that marks forming a line that are being displayed are indicated by the solid line, and marks forming a line that are not being displayed are indicated by the dotted line. The dotted lines need not necessarily displayed. The curve indicated by the thick dotted arrow illustrated in FIG. 15 (see (a)) indicates an example of the moving path of the line of sight of the player P.

For example, the game calculation section 110 displays two lines of marks OB11 and OB13 that respectively enclose the push button objects OB1 and OB3 that have been locked (see (a) in FIG. 15) before the combo process is started, and displays one integrated line of marks OB20 obtained by integrating the line of marks OB11 and OB13 (see (b) in FIG. 15) after the combo process has been started.

The integrated line of marks OB20 is a line of marks that encloses the push button objects OB1 and OB3 that are subjected to the combo process. The number of displayed marks included in the integrated line of marks OB20 represents the charge amount used during the combo process (hereinafter referred to as "integrated charge amount" (i.e., measured value after integration)). The details of the integrated charge amount are described later.

Therefore, the player P can determine whether or not the combo process with respect to the locked push button objects OB1 and OB3 has been started based on the visual effect displayed with respect to the locked push button objects OB1 and OB3 (e.g., whether or not the lines of marks OB11 and OB13 have been integrated into one line of marks OB20 (see FIG. 15)).

2-11-4. Integration of Charge Amounts During Combo Process

The combo process (integration of charge amounts) performed by the game calculation section 110 is described below.

The game calculation section 110 performs the combo process that integrates the charge amounts of two or more objects (e.g., push button objects OB1 and OB3) that are subjected to the combo process. In this case, the remaining charge amounts are also integrated. The term "remaining charge amount" used herein refers to the charge amount required until the lock with respect to the object is confirmed (threshold value Th2). The remaining charge amount decreases as the charge amount increases, and increases as the charge amount decreases. The charge amount obtained by integration is hereinafter referred to as "integrated charge amount", and the remaining charge amount obtained by integration is hereinafter referred to as "integrated remaining charge amount".

Figure 16:
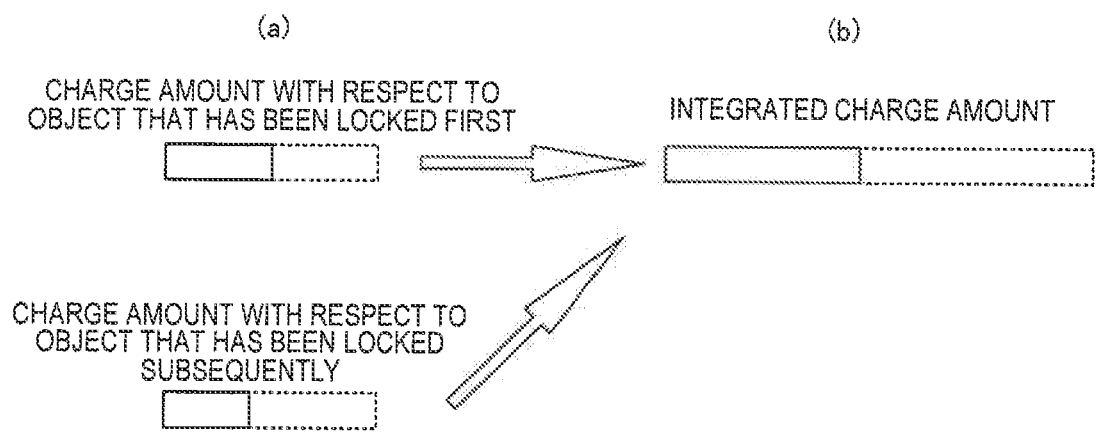
FIG. 16 illustrates integration of charge amounts.

(a) in FIG. 16 is a conceptual diagram illustrating the charge amount immediately before integration, and (b) in FIG. 16 is a conceptual diagram illustrating the integrated charge amount. In FIG. 16 ((a) and (b)), the charge amount is indicated by a solid line (block), and the remaining charge amount is indicated by a dotted line (block).

For example, the game calculation section 110 applies the charge amounts (and the remaining charge amounts) of the push button objects OB1 and OB3 that have been locked, to the push button objects OB1 and OB3 before the combo process is started (see (a) in FIG. 16). The game calculation section 110 applies the integrated charge amount (and the integrated remaining charge amount) obtained by integrating the charge amounts (and the remaining charge amounts) of the push button objects OB1 and OB3, to the push button objects OB1 and OB3 after the combo process has been started (see (b) in FIG. 16).

The expression "application of the charge amount" and the like mean that the state ("locked state", "unlocked state", and "confirmed state") is controlled based on the charge amount (and the remaining charge amount).

The ratio of the integrated charge amount to the integrated remaining charge amount ((b) in FIG. 16) is the same as the ratio of the total charge amount immediately before integration to the total remaining charge amount immediately before integration ((a) in FIG. 16).

The game calculation section 110 increases or decreases the integrated charge amount corresponding to the gaze time of the player P with respect to the push button object OB1 that is one of the push button objects OB1 and OB3 that have been subjected to the combo process, and has been locked earlier than the other.

The game calculation section 110 does not reflect the gaze time of the player P with respect to the push button object OB3 that is one of the push button objects OB1 and OB3 that have been subjected to the combo process, and has been locked later than the other, in the integrated charge amount.

Therefore, the player P can control the state of the push button objects OB1 and OB3 that have been subjected to the combo process between the locked state, the unlocked state, and the confirmed state by merely controlling the gaze time with respect to the push button object OB1 that has been locked earlier than the push button object OB3, after the combo process has been started. Since the charge amount before the combo process is started is used as the charge amount after the combo process has been started, it is possible to effectively utilize the gaze motion of the player P performed before the combo process is started.

In one embodiment of the invention, the integrated charge amount and the integrated remaining charge amount are set to have a size corresponding to the number of objects that have been subjected to the combo process (see (b) in FIG. 16). In this case, the gaze time required for the lock with respect to the object to be confirmed increases, and the gaze time required for the lock with respect to the object to be canceled increases as the number of objects that have been subjected to the combo process increases. The scale of the charge amount can be increased by increasing the second threshold value Th2, for example. Note that the scale of the charge amount can also be increased by decreasing the speed at which the charge amount increases and the speed at which the charge amount decreases instead of increasing the second threshold value Th2.

Although an example in which the game calculation section 110 reflects only the gaze time with respect to the push button object OB1 that is one of the push button objects OB1 and OB3 that have been subjected to the combo process, and has been locked earlier than the other, in the integrated charge amount (and the remaining charge amount), has been described above, the gaze time with respect to two or more push button objects that have been subjected to the combo process may be reflected in the integrated charge amount (and the remaining charge amount). Specifically, the game calculation section 110 may increase the integrated charge amount when the player P has gazed at at least one of two or more objects that have been subjected to the combo process, and may decrease the integrated charge amount when the player P has removed his/her gaze from all of two or more objects that have been subjected to the combo process. In such a case, the player P can increase the integrated charge amount by gazing at an arbitrary object among two or more objects that have been subjected to the combo process, and decrease the integrated charge amount by removing his/her gaze from all of the two or more objects.

2-11-5. Partial Cancelation Process During Combo Process

When the player P has performed the following actions (a) to (c) on a specific object that is included in two or more objects that have been subjected to the combo process within a sufficiently short predetermined time, the game calculation section 110 excludes the specific object from the target of the combo process. The sufficiently short predetermined time is equal to or shorter than 2 seconds, for example.

(a) The player P gazes at the specific object.

(b) The player P removes his/her gaze from the specific object.

(c) The player P gazes at the specific object.

The process that excludes an object that is included in two or more objects that have been subjected to the combo process from the target of the combo process is hereinafter referred to as "partial cancelation. process". The process that excludes an object from the target of the combo process is equivalent to a process that cancels the lock with respect to the object, for example.

An example in which the combo process is performed with respect to the push button objects OB1 and OB3 (see (a) in FIG. 17), and the player P cancels the lock with respect to the push button object OB3, is described below. Although an example in which the combo process is performed with respect to two objects is described below, the following description is similarly applied to the case where the combo process is performed with respect to three or more objects.

The player P can cancel the lock with respect to the push button object OB3 while maintaining the lock with respect to the push button object OB1 by gazing at the push button object OB3, removing his/her gaze from the push button object OB3, and gazing at the push button object OB1 again within the sufficiently short predetermined time.

2-11-6. Visual Effect Before and After Implementation of Partial Cancelation Process A visual effect before and after the implementation of the partial cancelation process is described below.

The game calculation section 110 changes the visual effect applied to the objects OB1 and OB3 that have been subjected to the combo process depending on whether or not the partial cancelation process has been performed.

Figure 17:
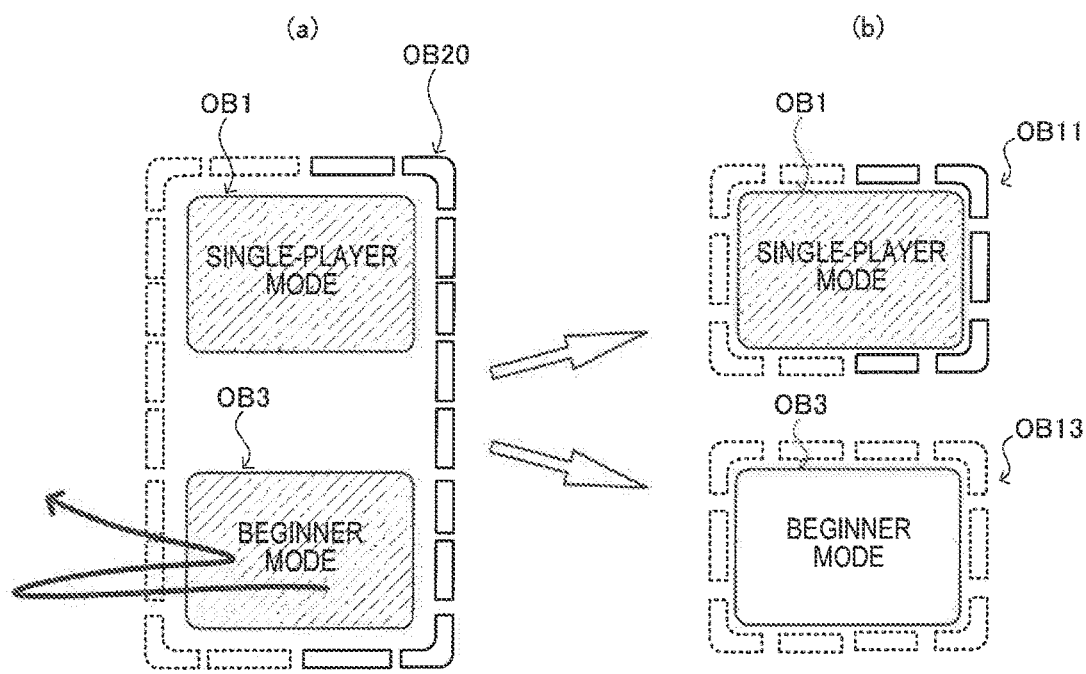
FIG. 17 illustrates a partial cancelation process.

(a) in FIG. 17 illustrates an example of the visual effect before the partial cancelation process is performed, and (b) in FIG. 17 illustrates an example of the visual effect after the partial cancelation process has been performed. FIG. 17 ((a) and (b)) illustrates an example in which a line of marks is used as the visual effect. Note that marks forming a line that are being displayed are indicated by the solid line, and marks forming a line that are not being displayed are indicated by the dotted line. The dotted lines need not necessarily displayed. The curve indicated by the thick dotted arrow illustrated in FIG. 17 (see (a)) indicates an example of the moving path of the line of sight of the player P.

For example, the game calculation section 110 displays an integrated line of marks OB20 that encloses the push button objects OB1 and OB3 that have been subjected to the combo process locked (see (a) in FIG. 17) before the partial cancelation process is performed, and displays two line of marks OB11 and OB12 obtained by dividing the integrated line of marks OB20 (see (b) in FIG. 17) after the partial cancelation process has been performed.

The line of marks OB11 is a line of marks that encloses the push button object OB1 that has been locked, and the number of marks of the line of marks OB11 that are being displayed represents the charge amount applied to the push button object OB1 that has been locked.

The line of marks OB13 is a line of marks that encloses the push button object OB3 that has been unlocked, and the number of marks of the line of marks OB13 that are being displayed represents the charge amount applied to the push button object OB3 that has been unlocked.

Therefore, the player P can determine whether or not the partial cancelation process has been performed with respect to the push button objects OB1 and OB3 (that have been subjected to the combo process) based on the visual effect displayed with respect to the push button objects OB1 and OB3 (e.g., whether or not the integrated line of marks OB20 has been divided into the lines of marks OB11 and OB13 (see FIG. 15)).

2-11-7. Separation of Charge Amount During Partial Cancelation Process

The partial cancelation process (separation of charge amount) performed by the game calculation section 110 is described below.

When the game calculation section 110 has started the partial cancelation process, the game calculation section 110 separates the charge amount with respect to the object that has been unlocked from the integrated charge amount. In this case, the remaining charge amount is also separated. The term "remaining charge amount" used herein refers to the charge amount required until the lock with respect to the object is confirmed (threshold value Th2). The remaining charge amount decreases as the charge amount increases, and increases as the charge amount decreases.

Figure 18:
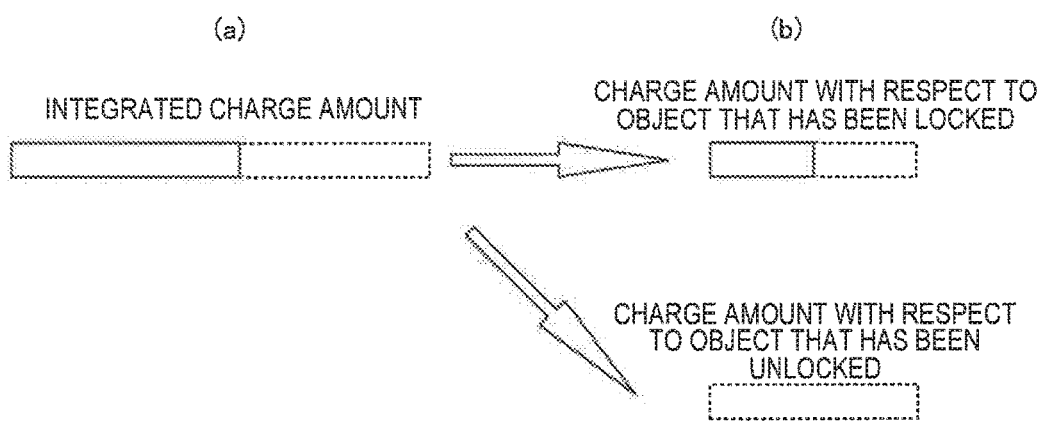
FIG. 18 illustrates separation of a charge amount.

(a) in FIG. 18 is a conceptual diagram illustrating the charge amount immediately before separation, and (b) in FIG, 18 is a conceptual diagram illustrating the charge amount immediately after separation. In FIG, 18 ((a) and (b)), the charge amount is indicated by a solid line (block), and the remaining charge amount is indicated by a dotted line (block).

For example, the game calculation section 110 applies the integrated charge amount (and the integrated remaining charge amount) to the push button objects OB1 and OB3 before the partial cancelation process is started (see (a) in FIG. 18). After the partial cancelation process has been started, the game calculation section 110 applies the integrated charge amount (and the integrated remaining charge amount) to the push button object OB1 that has been locked, and applies the charge amount (and the remaining charge amount) of the push button object OB3 to the push button object OB3 that has been unlocked (see (b) in FIG. 18).

The expression "application of the charge amount" and the like mean that the state ("locked state", "unlocked state", and "confirmed state") is controlled based on the charge amount (and the remaining charge amount).

The integrated charge amount and the integrated remaining charge amount immediately before the partial cancelation process is performed ((a) in FIG. 18) is applied to the charge amount and the remaining charge amount of the push button object OB1 that has been locked (see the upper side of (b) in FIG. 18). In the example illustrated in (b) in FIG. 18 in which the number of objects that have been locked is "1", the combo process is automatically terminated. When the number of objects that have been locked is "2" or more, the combo process is continued, and the integrated charge amount and the integrated remaining charge amount are applied during the combo process.

The integrated charge amount and the integrated remaining charge amount immediately before the partial cancelation process is performed ((a) in FIG. 18) is not applied to the charge amount and the remaining charge amount of the push button object OB3 that has been unlocked (see the lower side of (b) in FIG. 18). The charge amount of the push button object OB3 that has been unlocked (see the lower side of (b) in FIG. 18) is set to "0" at the cancelation timing.

The game calculation section 110 increases or decreases the charge amount of the push button object OB1 corresponding to the gaze time of the player P with respect to the push button object OB1 that has been locked. When the number of objects that have been locked is "2" or more, the combo process is continued, and the integrated charge amount is increased or decreased corresponding to the gaze time with respect to the object that has been locked at the earliest timing.

The game calculation section 110 increases or decreases the charge amount of the push button object OB3 corresponding to the gaze time of the player P with respect to the push button object OB3 that has been unlocked.

Therefore, the player P can cancel only the lock with respect to the push button object OB3 while maintaining the lock with respect to the push button object OB1 by gazing at the specific push button object OB3 again after the combo process has been started. Since the charge amount before cancelation is applied to the charge amount after cancelation, it is possible to effectively utilize the gaze motion of the player P performed before cancelation.

In one embodiment of the invention, the charge amount and the remaining charge amount are set to have a size corresponding to the number of objects to which the charge amount is applied (see (b) in FIG. 18). In this case, the gaze time required for the lock with respect to the object to be confirmed decreases, and the gaze time required for the lock with respect to the object to be canceled decreases as the number of objects to which the charge amount is applied decreases. The scale of the charge amount can be decreased by decreasing the second threshold value Th2, for example. Note that the scale of the charge amount can also be decreased by increasing the speed at which the charge amount increases and the speed at which the charge amount decreases instead of decreasing the second threshold value Th2.

Although an example in which the partial cancelation process is performed during the combo process has been described above, the partial cancelation process may be performed when the combo process is not performed. Specifically, when the player P has performed the actions (a) to (c) on one object that has been locked within the sufficiently short predetermined time, the game calculation section 110 may determine that the lock with respect to the object has been canceled, and reset the charge amount with respect to the object to "0".

2-12. Control of Degree of Lock

The game calculation section 110 sets the determination standard for determining that the player P is gazing at the object that has been locked (determination standard for the gaze determination process on the object that has been locked) to be less severe than the determination standard for determining that the player P is gazing at the object that is not locked (determination standard for the gaze determination process on the object that is not locked). The degree of lock with respect to the object can be increased by setting the determination standard to be less severe. Note that the term "degree of lock" used herein refers to the possibility that the lock is canceled.

Specifically, the player P cannot lock the object that is not locked without gazing at the object, but can easily maintain the lock with respect to the object (that has been locked) without gazing at the object.

The following description is given taking the push button object OB1 (see FIGS. 12A and 12B) as an example. Note that the following description is similarly applied to other objects.

The game calculation section 110 determines whether or not the player P is gazing at the push button object OB1 based on whether or not at least part of the hit area OBHA that is set to the push button object OB1 and at least part of the line-of-sight area LSA overlap each other (see above). The game calculation section 110 determines that the player P is gazing at the push button object OB1 when at least part of the hit area OBHA that is set to the push button object OB1 and at least part of the line-of-sight area LSA overlap each other, and determines that the player P is not gazing at the push button object OB1 when at least part of the hit area OBHA that is set to the push button object OB1 and at least part of the line-of-sight area LSA do not overlap each other.

The game calculation section 110 increases the size of at least one of the hit area OBHA that is set to the push button object OB1 and the line-of-sight area LSA so that the determination standard for the gaze determination process on the push button object OB1 becomes less severe.

An example in which the size of the hit area OBHA is variable, and the size of the line-of-sight area LSA is fixed, is described below for convenience of explanation taking account of a situation in which the determination standard is controlled on an object basis. The size adjustment may be performed continuously, or may be performed stepwise as described below.

The game calculation section 110 sets the determination standard for the gaze determination process on the push button object OB1 to be less severe as the charge amount with respect to the push button object OB1 increases. Specifically, the game calculation section 110 increases the size of the hit area OBHA that is set to the push button object OB1 as the charge amount with respect to the push button object OB1 increases.

Figure 20A:
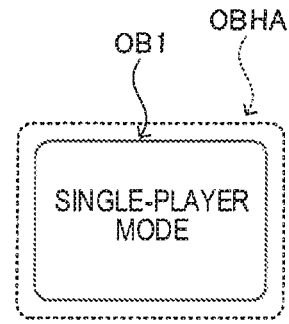
FIGS. 20A to 20C illustrate a degree-of-lock control process.
Figure 20B:
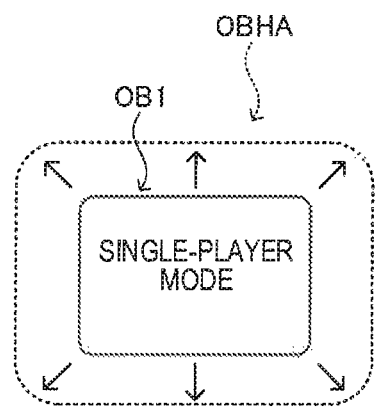
Figure 20C:
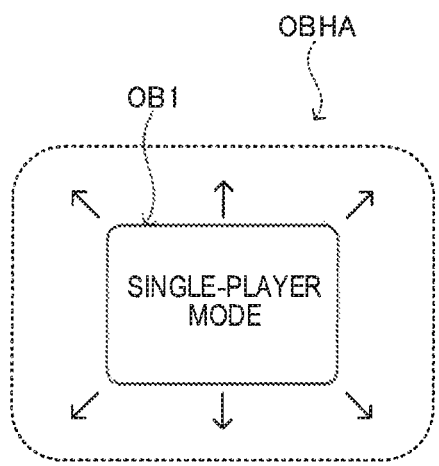

For example, the game calculation section 110 sets the size of the hit area OBHA that is set to the push button object OB1 to a normal size illustrated in FIG. 20A when the push button object OB1 is not locked, sets the size of the hit area OBHA that is set to the push button object OB1 to a medium size illustrated in FIG. 20B when the charge amount with respect to the push button object OB1 is less than a predetermined value (e.g., "3") between the threshold values Th1 and Th2, and sets the size of the hit area OBHA that is set to the push button object OB1 to a large size illustrated in FIG. 20C when the charge amount with respect to the push button object OB1 is equal to or larger than the predetermined value (e.g., "3").

In this case, the degree of lock with respect to the push button object OB1 increases as the gaze time of the player P with respect to the push button object OB1 increases.

The game calculation section 110 sets the enlargement ratio of the size of the hit area OBHA in the rightward-leftward direction with respect to the player P to be larger than the enlargement ratio of the size of the hit area OBHA in the upward-downward direction with respect to the player P (see FIGS. 20A, 20B, and 20C).

According to this configuration, the degree of lock with respect to the push button object OB1 in the rightward-leftward direction is relatively higher than the degree of lock with respect to the push button object OB1 in the upward-downward direction.

Since the line-of-sight direction of the player P (that is determined by the attitude of the head, for example) is normally unstable in the rightward-leftward direction as compared with the upward-downward direction, it is considered that an erroneous eye input (e.g., a situation in which the player P unintentionally cancels the lock with respect to the object) can be reduced without impairing operability when the degree of lock in the rightward-leftward direction is set to be relatively higher than the degree of lock in the upward-downward direction.

2-13. Supplementation with Respect to Control of Degree of Lock

Although an example in which the game calculation section 110 controls the degree of lock by adjusting (spatially adjusting) the size of the line-of-sight area LSA, has been described above, the degree of lock may be controlled by adjusting (temporally adjusting) the speed at which the charge amount decreases, or may be controlled by combining the spatial adjustment and the temporal adjustment.

For example, the game calculation section 110 may decrease the speed at which the charge amount approaches the third threshold value Th3 as the charge amount with respect to the push button object OB1 increases. Note that the speed at which the charge amount approaches the third threshold value Th3 may be adjusted by adjusting the threshold value, or adjusting the speed at which the charge amount increases or decreases (see above).

In this case, the player P cannot lock the object without gazing at the object for a time equal to or longer than a specific time (e.g., when the player P hesitates to lock the object). On the other hand, the lock with respect to the object is maintained unless the player P removes his/her gaze from the locked object for a long time.

Although an example in which the game calculation section 110 adjusts (spatially adjusts) the size of the hit area OBHA within the virtual three-dimensional space OBS, has been described above, the game calculation section 110 may adjust the size of the line-of-sight area LSA within the virtual three-dimensional space OBS, or may adjust the size of both the hit area OBHA and the line-of-sight area LSA. In this case, the game calculation section 110 may control the size of the line-of-sight area LSA corresponding to the charge amount with respect to the object that is situated nearest to the line-of-sight area LSA, for example.

2-14. Flow of Eye Input Reception Process

The flow of the eye input reception process that is performed by the game calculation section 110 is described below with reference to FIG. 21.

The flow of the eye input reception process is appropriately performed during, before, after the fear of heights experience game (FIGS. 8 and 9), when it is necessary for the game system 1 to receive one or more instructions from the player P, for example. The flow of the eye input reception process is performed corresponding to each object (object that can be designated by the player P) that is subjected to the eye input reception process. The selection screen (FIG. 10) is used as an example.

For example, when the mode of the game process has been set to the single-player mode or the two-player mode, the push button objects OB1 and OB2 displayed within the selection screen (FIG. 10) are not subjected to the eye input reception process, and the push button objects OB3 and OB4 displayed within the selection screen (FIG. 10) are subjected to the eye input reception process.

When the mode of the game process has been set to the beginner mode or the advanced mode, the push button objects OB3 and OB4 displayed within the selection screen (FIG. 10) are not subjected to the eye input reception process, and the push button objects OB1 and OB2 displayed. within the selection screen (FIG. 10) are subjected to the eye input reception process.

Figure 21:
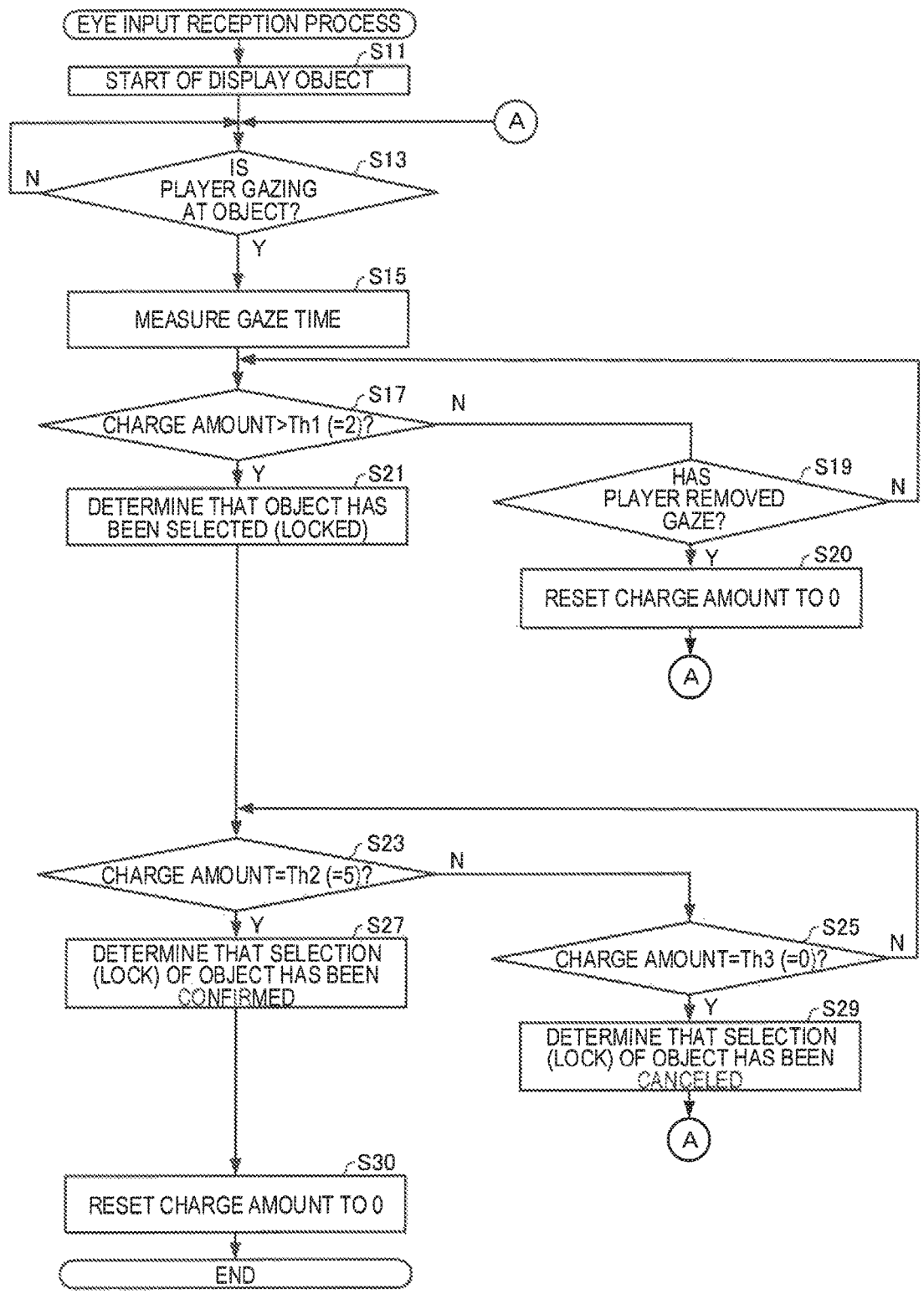
FIG. 21 is a flowchart illustrating an eye input reception process.

The flow illustrated in FIG. 21 is described below.

The game calculation section 110 displays the object that is subjected to the eye input reception process (step S11). The object is displayed by placing the object in the virtual three-dimensional space.

The game calculation section 110 performs the gaze determination process with respect to the object (step S13). When the player P is gazing at the object (step S13Y), the game calculation section 110 measures the gaze time with respect to the object (step S15). When the player P is not gazing at the object (step S13N), the game calculation section 110 repeats the gaze determination process (step S13). When the gaze time is measured, the charge amount is increased corresponding to the time in which the player P gazes at the object, and is decreased corresponding to the time in which the player P removes his/her gaze from the object. When the game calculation section 110 has started to measure the gaze time (step S15), the game calculation section 110 performs the gaze determination process, and cyclically repeats the process that increases or decreases the charge amount corresponding to the result of the gaze determination process until the charge amount is reset. The repetition cycle is set to be identical to the frame cycle, for example.

The game calculation section 110 repeats the process that determines whether or not the charge amount has reached the first threshold value Th1 (=2) (step S17), and the process that determines whether or not the player P has removed his/her gaze from the object (step S19) as long as the charge amount does not exceed the first threshold value Th1(=2) (step S17N), and the player P has not removed his/her gaze from the object (step S19N).

When the player P has removed his/her gaze from the object (step S19Y) before the charge amount exceeds the first threshold value Th1 (=2) (step S17N), the game calculation section 110 resets the charge amount with respect to the object to "0" (step S20), and performs the gaze determination process (step S13).

When the charge amount has exceeded the first threshold value Th1 (=2) (step S17Y), the game calculation section 110 determines that the object has been locked (step S21). The object is thus locked.

When the object has been locked (step S21), the game calculation section 110 repeats the process that determines whether or not the charge amount has reached the second threshold value Th2 (=5) (step S23), and the process that determines whether or not the charge amount has decreased to the third threshold value Th3 (=0) (step S25) as long as the charge amount has not reached the second threshold value Th2 (=5) (step S23N), and the charge amount has not decreased to the third threshold value Th3 (=0) (step S25N).

When the charge amount has decreased to the third threshold value Th3 (=0) (step S25Y), the game calculation section 110 determines that the lock with respect to the object has been canceled (step S29), and performs the gaze determination process (step S13).

When the charge amount has reached the second threshold value Th2 (=5) (step S23Y), the game calculation section 110 determines that the lock with respect to the object has been confirmed (step S27), resets the charge amount to "0" (step S30), and terminates the process (flow). The lock with respect to the object is thus confirmed.

When the charge amount with respect to the object has exceeded the first threshold value Th1 (step S17Y), or when the player P has removed his/her gaze from the object (step S19Y) before the charge amount reaches the second threshold value, or when the charge amount has reached the second threshold value Th2 (step S23Y), or when the charge amount has decreased to the third threshold value Th3 (step S25Y), the game calculation section 110 performs the process that changes the visual effect applied to the object (see FIG. 14, for example).

2-15. Flow of Combo Process

Figure 22:
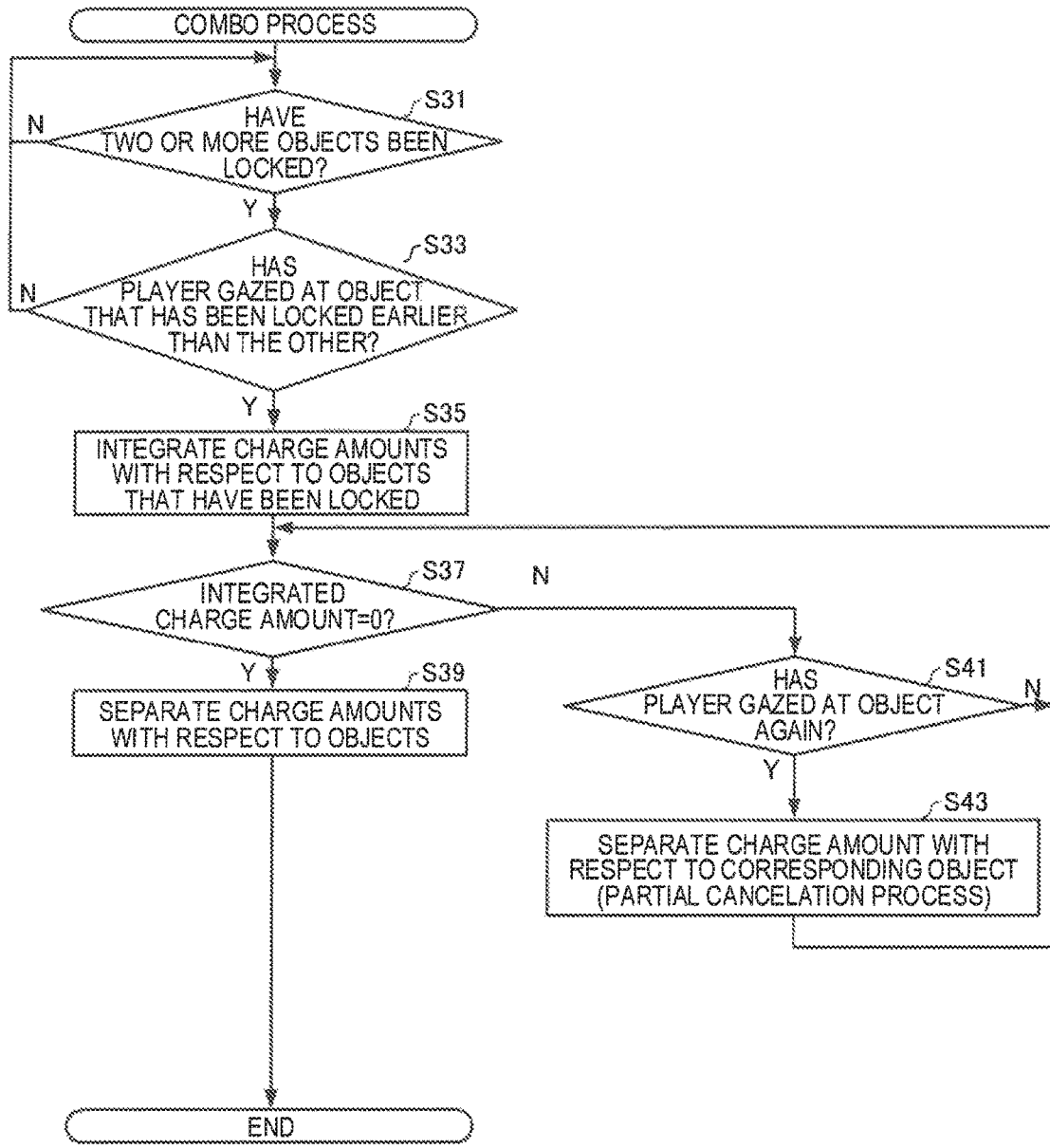
FIG. 22 is a flowchart illustrating a process that is performed in connection with a combo process.

The flow of the combo process is described below with reference to FIG. 22.

The flow of the combo process is performed in parallel with the flow of the eye input reception process (FIG. 21). The flow of the combo process is not performed on an object basis, but is performed corresponding to a plurality of objects that can be designated by the player P.

The game calculation section 110 repeats the process that determines whether or not two or more objects have been locked (step S31) as long as two or more objects have not been locked (step S31N).

When two or more objects have been locked (step S31Y), the game calculation section 110 performs a step S33.

The game calculation section 110 determines whether or not the player P has gazed at the object that is one of the two or more objects have been locked, and has been locked earlier than the other (i.e., whether or not the combo implementation condition has been satisfied) (step S33). When the combo implementation condition has not been satisfied (step S33N), the game calculation section 110 performs the lock determination process (step S31). When the combo implementation condition has been satisfied (step S33Y), the game calculation section 110 performs the combo process (steps S35 to S43).

During the combo process (steps S35 to S43), the game calculation section 110 performs an integration process that integrates the charge amounts with respect to the two or more objects that have been locked (step S35). The charge amounts with respect to the two or more objects are thus integrated into the integrated charge amount.

The game calculation section 110 repeats the process that determines whether or not the integrated charge amount has reached "0" (step S37), and the start condition determination process (step S41) as long as the integrated charge amount has not reached "0" (step S37N), and the start condition with respect to the partial cancelation process (i.e., a condition whereby the player P has gazed at one of the two or more objects (that have been locked) again) has not been satisfied (step S41N).

When the start condition has been satisfied (step S41Y), the game calculation section 110 performs the partial cancelation process that separates the charge amount with respect to the object that has been gazed at again from the integrated charge amount (step S43). The partial cancelation process (step S43) cancels the lock with respect to the object that has been gazed at again, and sets the charge amount with respect to the object that has been gazed at again to "0".

When the integrated charge amount has reached "0" (step S37Y), the game calculation section 110 performs a separation process that separates the charge amounts with respect to all of the objects that have been locked (step S39). The separation process (step S39) sets the charge amounts with respect to all of the objects that have been locked to "0". After the game calculation section 110 has performed the separation process (step S39), the game calculation section 110 terminates the process (flow).

When the combo process has been started (step S53), or when the partial cancelation process has been performed (step S43), the game calculation section 110 performs the process that changes the visual effect applied to the object (see FIGS. 15 and 17, for example).

2-16. Flow of Degree-of-Lock Control Process

Figure 23:
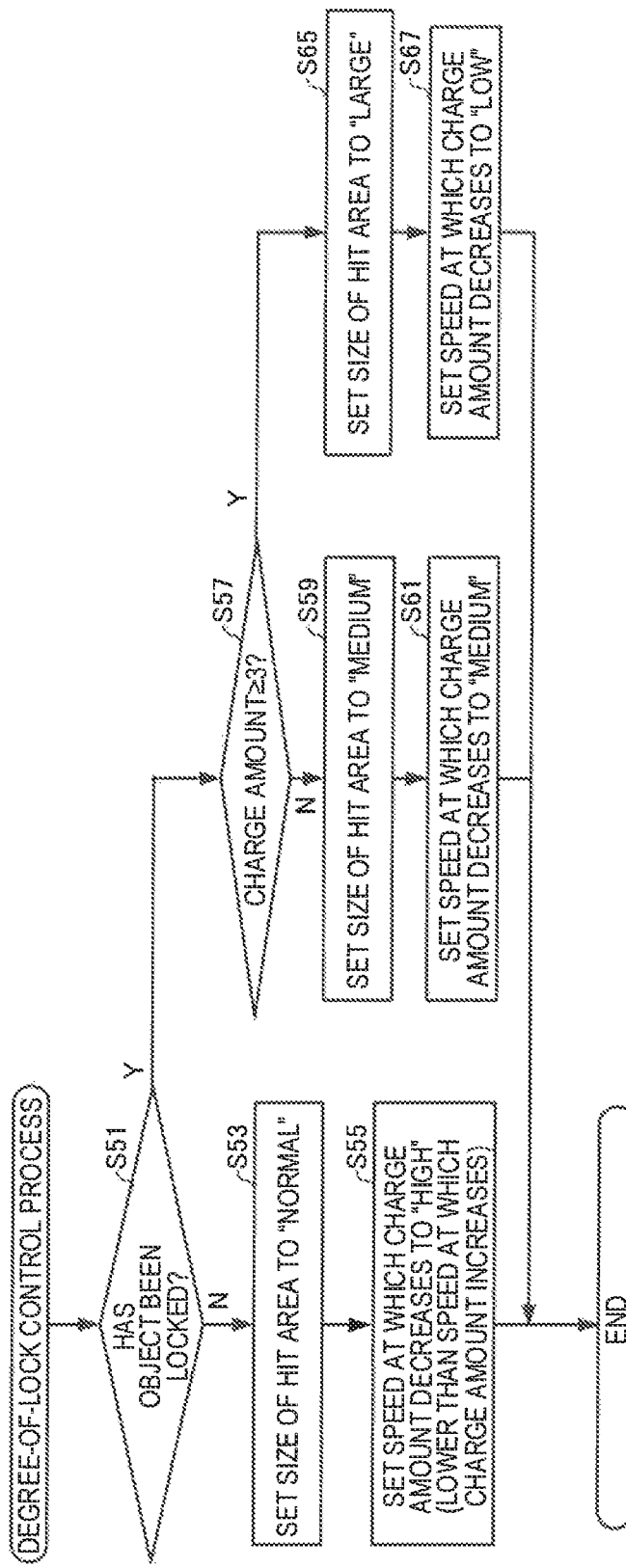
FIG. 23 is a flowchart illustrating a degree-of-lock control process.

The flow of the degree-of-lock control process is described below with reference to FIG. 23.

The flow of the degree-of-lock control process is performed in parallel with the flow of the eye input reception process (FIG. 21). The flow of the degree-of-lock control process is repeatedly performed corresponding to each object that has been subjected to the eye input reception process.

The game calculation section 110 determines whether or not the object has been locked (step S51).

When the object has not been locked (step S51N), the game calculation section 110 sets the size of the hit area to "normal" (step S53), sets the speed at which the charge amount decreases when the player P has removed his/her gaze from the object to "high" (step S55), and terminates the process (flow). Note that the speed at which the charge amount decreases is lower than the speed at which the charge amount increases.

When the object has been locked (step S51Y), the game calculation section 110 determines whether or not the charge amount with respect to the object is equal to or larger than "3" (step S57).

When the charge amount with respect to the object is not equal to or larger than "3" (step S57N), the game calculation section 110 sets the size of the hit area to "medium" (step S59), sets the speed at which the charge amount decreases when the player P has removed his/her gaze from the object to "medium" (step S61), and terminates the process (flow)

When the charge amount with respect to the object is equal to or larger than "3" (step S57Y), the game calculation section 110 sets the size of the hit area to "large" (step S65), sets the speed at which the charge amount decreases when the player P has removed his/her gaze from the object to "low" (step S67), and terminates the process (flow).

Note that the game calculation section 110 sets the enlargement ratio of the size of the hit area in the rightward-leftward direction with respect to the player P to be larger than the enlargement ratio of the size of the hit area in the upward-downward direction with respect to the player P (see FIGS. 20A to 20C). The above steps may be appropriately changed in order.

2-17, Application Example of Eye Input

For example, a mode in which the player P is given a mission to catch (rescue) a cat effect object 80, and a mode in which the player P is not given a mission to catch (rescue) the cat effect object 80, are provided to the fear of heights experience game according to one embodiment of the invention.

Figure 24:
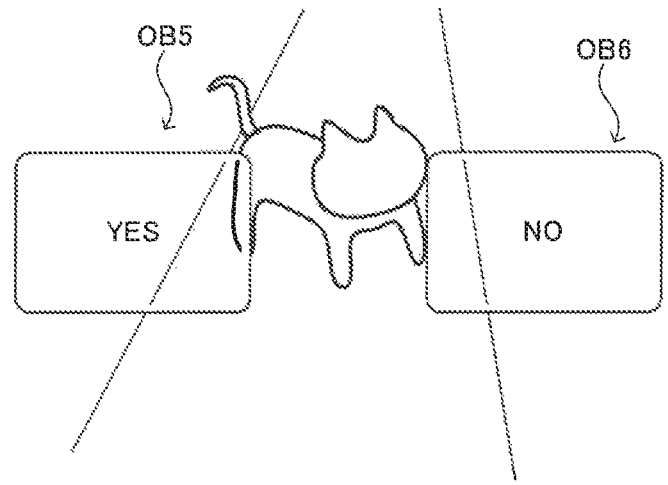
FIG. 24 illustrates an application example of an eye input.

In this case, the game calculation section 110 places a character image "Do you catch the cat?", a cat object, and push button objects OB5 and OB6 within the virtual three-dimensional space OBS (see FIG. 24) when the game starts, for example.

The push button object OB5 is a push button object for the player P to input "YES" to the simulation control device 100, and the push button object OB6 is a push button object for the player P to input "NO" to the simulation control device 100.

Figure 25:
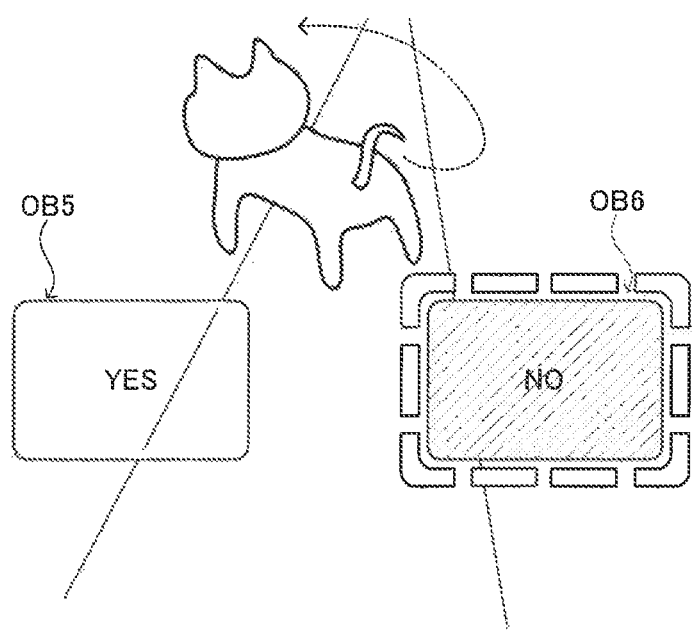
FIG. 25 illustrates an application example of an eye input.

For example, when the player P has locked the push button object OB6 that corresponds to "NO", and confirmed the lock with respect to the push button object OB6 by performing an eye input (see FIG. 25), the game calculation section 110 displays an animation in which the cat object moves away from the virtual moving path within the virtual three-dimensional space OBS through the object space setting section 111. The game calculation section 110 causes the cat effect object 80 to move away from the end point of the actual moving path R through the effect control processing section 114.

For example, when the player P has locked the push button object OB5 that corresponds to "YES", and confirmed the lock with respect to the push button object OB5 by performing an eye input, the game calculation section 110 displays an animation in which the cat object runs away toward the end point of the virtual moving path within the virtual three-dimensional space OBS through the object space setting section 111. The game calculation section 110 places the cat effect object 80 at the end point of the actual moving path R through the effect control processing section 114.

Although an example in which the object that can be designated by the player P by means of an eye input is the push button object (icon), has been described above, the object may be a character (enemy character, ally character, animal character, or player's avatar), an item (treasure box or card), or the like, or may be part of a character or an item.

2-18. Advantageous Effects of Embodiments (1)

As described above, the simulation control device 100 includes the display processing section 110A that displays the virtual three-dimensional space on the HMD 20, the measurement section 110B that measures the gaze time of the player P with respect to the object placed within the virtual three-dimensional space, and decreases the charge amount corresponding to the time in which the player P does not gaze at the object when the player P has removed his/her gaze from the object, the reception section 110C that determines that the object has been locked when the charge amount has reached the first threshold value Th1, determines that the lock with respect to the object has been confirmed when the charge amount has reached the second threshold value Th2 that is larger than the first threshold value Th1, and determines that the lock with respect to the object has been canceled when the charge amount has decreased to the third threshold value Th3, the notification section 110D that notifies the player P of the magnitude of the charge amount, and the execution section 110E that performs a predetermined process linked to the object when it has been determined that the lock with respect to the object has been confirmed.

Therefore, the player P can lock the object by gazing at the object until the charge amount with respect to the object reaches the first threshold value Th1. On the other hand, the player P can maintain the object to be in an unlocked state by gazing at (glancing) the object so that the charge amount with respect to the object does not exceed the first threshold value Th1.

When the object has been locked, the lock with respect to the object is maintained until the charge amount decreases to the third threshold value Th3 even when the player P has removed his/her gaze from the object. Therefore, the player P need not fix the line of sight in order to maintain the lock with respect to the object. The player P can cancel the lock with respect to the object by removing his/her gaze from the object until the charge amount decreases to the third threshold value Th1.

After the object has been locked, the player P can input an instruction that confirms the lock with respect to the object to the simulation control device 100 by merely gazing at the object until the charge amount reaches the second threshold value Th2. On the other hand, the player P can maintain the lock with respect to the object by gazing at the object, or removing his/her gaze from the object so that the charge amount fall within the range between the second threshold value Th2 and the third threshold value Th3.

Therefore, the player P can arbitrarily control the state of the object between the locked state, the unlocked state, and the confirmed state by performing an eye input. The term "eye input" refers to an input performed by the player P when the player P has input an instruction to the simulation control device 100 by gazing at the object.

Since the game calculation section 110 that functions as the notification section 110D notifies the player P of the charge amount, the player P can determine the object at which the player P gazes, and determine whether or not the player P is gazing at the desired object. The player P can also determine the remaining time until the object is locked, the remaining time until the lock with respect to the object is canceled, and the gaze time required for the lock with respect to the object to be confirmed, based on the charge amount.

Therefore, the simulation control device 100 allows the player P to comfortably perform an eye input.

2-19. Advantageous Effects of Embodiments (2)

When the combo implementation condition has been satisfied in a state in which two or more objects have been selected, the game calculation section 110 that functions as the reception section 1100 performs the combo process that determines at least whether or not the lock with respect to the two or more objects that have been selected has been confirmed or canceled based on the common charge amount.

When the combo process has started, the player P can perform an input with respect to two or more objects that have been locked by performing a common eye input. Therefore, the player P can conveniently perform an eye input (mainly a head turn motion in one embodiment of the invention) as compared with the case where the player P performs an eye input corresponding to each of two or more objects.

2-20. Advantageous Effects of Embodiments (3)

The game calculation section 110 that functions as the measurement section 110B sets the determination standard for determining that the player P is gazing at the object that has been locked to be less severe than the determination standard for determining that the player P is gazing at the object that is not locked.

Therefore, the player P cannot lock the object that is not locked without gazing at the object, but can easily maintain the lock with respect to the object (that has been locked) without gazing at the object.

For example, when the determination standard is adjusted by spatial adjustment (see above), the player P cannot lock the object without gazing at the object at a position around the center of the object (e.g., when the player P hesitates to lock the object). On the other hand, the lock with respect to the object is maintained unless the player P moves his/her gaze to a position away from the center of the object.

For example, when the determination standard is adjusted by temporal adjustment (see above), the player P cannot lock the object without gazing at the object for a time equal to or longer than a specific time (e.g., when the player P hesitates to lock the object). On the other hand, the lock with respect to the object is maintained unless the player P removes his/her gaze from the locked object for a long time.

Therefore, the simulation control device 100 can reduce a situation in which the player P performs an erroneous eye input (e.g., cancellation of the lock with respect to the object due to unintentional head shake) after the object has been locked.

3. Modifications 3-1. Motion Sensor

Although the game system 1 has been described above taking an example in which the imaging camera 70 is used to detect the position and the attitude of the head of the player P, a motion sensor provided to the HMD 20 may be used, or the imaging camera 70 and a motion sensor may be used in combination. An acceleration sensor, an angular velocity sensor (gyro sensor), or the like may be used as the motion sensor, A motion sensor is suitable for accurately detecting the motion of a moving object (e.g., the head of the player P) that changes in attitude.

3-2. Detection of Line of Sight

Although the embodiments have been described above taking an example in which the game calculation section 110 sets the motion (position and attitude) of the display area DS and the line-of-sight area LSA within the virtual three-dimensional space OBS to follow the motion position and attitude) of the head of the player P, the game calculation section 110 sets the motion (position and attitude) of the display area DS and the line-of-sight area LSA within the virtual three-dimensional space OBS to follow the motion (position and attitude) of the eyeball of the player P.

Alternatively, the game calculation section 110 may set the motion (position and attitude) of the display area DS and the line-of-sight area LSA within the virtual three-dimensional space OBS to follow the motion of the head and the eyeball of the player P.

In this case, the game calculation section 110 may set the motion of the display area DS within the virtual three-dimensional space OBS to follow the motion of the head of player P, and set the motion of the line-of-sight area LSA within the display area DS to follow the motion of the eyeball of player P.

The motion of the eyeball of the player P may be detected by providing a line-of-sight sensor that detects the line-of-sight direction of the player P to the HMD 20, and causing the processing section 101 (game calculation section 110) to receive the output from the line-of-sight sensor through the communication section 196 and the communication control section 120, for example.

At least one of the following line-of-sight sensors (1) and (2) may be used as the line-of-sight sensor, for example.

(1) A line-of-sight sensor that includes a camera that captures at least one eye of the player P, and a processing section that detects the position of the pupil of the player P (i.e., information that represents the direction of the visual axis) based on the image captured by the camera.

(2) A line-of-sight sensor that includes a light-emitting section that emits detection light (e.g., infrared light) toward at least one eye of the player P, a detection section that detects the quantity of reflected light (detection light) from the retina of the eyeball, and a processing section that detects the direction of the visual axis of the eyeball based on the output from the detection section.

When the line-of-sight sensor is used, it is desirable to perform a calibration process on the line-of-sight sensor corresponding to each player P. The calibration process performed on the line-of-sight sensor is a process for accurately detecting the line-of-sight direction of the player P independently of an individual variation in the position of the eyeball of each player P, an individual variation in the size of the pupil of each player P, a variation in the attitude of the HMD 20, and the like. For example, the calibration process allows the player P who wears the HMD 20 to gaze at several known directions, and adjusts the parameters of the processing section based on the output from the line-of-sight sensor.

3-3. Virtual Mechanical Switch

Although the embodiments have been described above taking an example in which the game calculation section 110 changes the enhancement level with respect to the object in order to notify the player P of the charge amount (see FIGS. 14 and 19, for example), the enhancement level may be changed using another method. For example, the outward appearance of the object may be changed.

For example, the game calculation section 110 may utilize a virtual push button (virtual mechanical switch) as an object that can be designated by the player P, and change the amount of depression of the virtual mechanical switch corresponding to the charge amount. In this case, the game calculation section 110 increases the amount of depression of the virtual mechanical switch as the charge amount increases so that the player P can press the virtual mechanical switch by gazing at the virtual mechanical switch. The virtual mechanical switch is locked when the virtual mechanical switch has been pressed (gazed at), and the lock with respect to the virtual mechanical switch is confirmed when the virtual mechanical switch has been further pressed (gazed at).

3-4. Selection

The embodiments have been described above taking an example in which the game calculation section 110 starts measurement at a timing at which the player has gazed at one object, determines that the object has been selected (locked) at a timing at which the charge amount has exceeded the first threshold value Th1, determines that the lock with respect to the object has been confirmed at a timing at which the charge amount has reached the second threshold value Th1, and determines that the lock with respect to the object has been canceled at a timing at which the charge amount has decreased to the third threshold value Th3. Note that the term (instruction) used in connection with the game calculation section 110 at each timing may be replaced by another term.

For example, the terms (instructions) may be replaced by the following terms. Specifically, the game calculation section 110 may determine that one object has been selected at a timing at which the player has gazed at the object, determine that the object is continuously selected (locked) at a timing at which the charge amount has exceeded the first threshold value Th1, determine that the selection of the object has been confirmed at a timing at which the charge amount has reached the second threshold value Th1, and determine that the selection of the object has been canceled at a timing at which the charge amount has decreased to the third threshold value Th3.

3-5. Assignment of Functions

The functions of the elements of the game system 1 according to the embodiments may be appropriately modified as long as the effects are not impaired.

For example, some of the functions of the HMD 20 may be implemented by the simulation control device 100, and some or all of the functions of the simulation control device 100 may be implemented by the HMD 20. The function of each element included in the processing section 101 of the simulation control device 100 may also be appropriately modified.

For example, some or all of the functions of the display processing section 110A may be implemented by the object space setting section 111, and some or all of the functions of the object space setting section 111 may be implemented by the display processing section 110A.

Some or all of the functions of the measurement section 110B may be implemented by the state detection processing section 112, and some or all of the functions of the state detection processing section 112 may be implemented by the measurement section 110B.

The simulation control device 100 may include a dedicated circuit (hardware) that implements some or all of the functions of the processing section 101. Specifically, some or all of the functions of the processing section 101 may be implemented by means of software, or may be implemented by means of hardware.

3-6. Game Device

Although the embodiments have been described above taking an example in which an eye input performed using the HMD 20 is applied to the game system 1 (simulation control device 100 included in the game system 1) that includes the structure that defines the real space in which the player P can move, an eye input performed using the HMD 20 may also be applied to another game system.

For example, an eye input performed using the HMD 20 may be applied to a system that is configured so that a game is provided from a server device to a terminal device through a network (e.g., Internet). In this case, the game program may be executed by the terminal device, or may be executed by the server device. The terminal device may implement the game by means of an operation input and streaming image display.

An eye input performed using the HMD 20 may be applied to a stand-alone game device that is not connected to a network, and may be applied to a terminal device that allows the user to perform an operation input using a touch panel (e.g., smartphone, tablet-type information terminal device, personal computer, monitor, or TV).

3-7. Eye Input Device

Although the embodiments have been described above taking an example in which the non-see-through HMD 20 is used to perform an eye input, another wearable image display device such as a sec-through HMD or a monocular HMD may be used to perform an eye input. The HMD may be worn by the player P using various methods (e.g., cap-type HMD, eyeglass-type HMD, helmet-type HMD, sun visor-type HMD, and headband-type HMD).

4. Other

The invention is not limited to the embodiments described above. Various modifications and variations may be made of the embodiments described above. Any term cited with a different term having a broader meaning or the same meaning at least once in the specification and the drawings may be replaced by the different term in any place in the specification and the drawings.

The invention includes various other configurations substantially the same as the configurations described above in connection with the embodiments (e.g., a configuration having the same function, method, and results, or a configuration having the same objective and effects). The invention also includes a configuration in which an unsubstantial element described above in connection with the embodiments is replaced by another element. The invention also includes a configuration having the same effects as those of the configurations described above in connection with the embodiments, or a configuration capable of achieving the same objective as that of the configurations described above in connection with the embodiments. The invention further includes a configuration in which a known technique is added to the configurations described above in connection with the embodiments.

Although only some embodiments of the invention have been described in detail above, those skilled in the art would readily appreciate that many modifications are possible in the embodiments without materially departing from the novel teachings and advantages of the invention. Accordingly, all such modifications are intended to be included within the scope of the invention.

What is claimed is:

1. A simulation control device comprising:
   an communicator configured to communicate with a wearable image display device;
   a processor connected to the communicator, the processor being configured to:
      instruct the wearable image display device, via the communicator, to display a virtual space;
      detect a position in a real space of a user wearing the wearable image display device;
      calculate a line of sight area of the user in the virtual space based on the detected position;
      measure a gaze time of the user with respect to an object that is placed in the virtual space, based on a positional relationship between the line of sight area and the object;
      determine that the object has been selected when the measured gaze time has reached a first threshold value;
      determine that the selection has been confirmed when the measured value has reached a second threshold value that is larger than the first threshold value; and
      notify the user of a magnitude of the measured value.

2. The simulation control device as defined in claim 1, wherein the processor is further configured to:
   decrease the measured value corresponding to a time in which the user does not gaze at the object when the user has removed his/her gaze from the object; and
   determine that the selection has been canceled when the measured value has decreased to a third threshold value before the selection is confirmed.

3. The simulation control device as defined in claim 2, wherein the processor is further configured to decrease a speed at which the measured value approaches the third threshold value after the object has been selected, to be lower than a speed at which the measured value approaches the second threshold value.

4. The simulation control device as defined in claim 1, wherein the processor is further configured to instruct the wearable image display device to display a visual effect that corresponds to the measured value to the object.

5. The simulation control device as defined in claim 4, wherein the processor is further configured to instruct the wearable image display device to distinguish the object that has been selected from the object that is not selected.

6. The simulation control device as defined in claim 4, wherein the visual effect is an animation.

7. The simulation control device as defined in claim 6, wherein the animation places a ring-shaped or subring-shaped gauge around an outer edge of the object, and changes a length of the gauge corresponding to the measured value.

8. The simulation control device as defined in claim 6, wherein the animation places a line of marks around an outer edge of the object, and changes a number of marks that form the line of marks corresponding to the measured value.

9. The simulation control device as defined in claim 6, wherein the animation changes an enhancement level with respect to the object corresponding to the measured value.

10. The simulation control device as defined in claim 1, wherein the processor is further configured to:
perform a predetermined process that is linked to the object when the selection of the object has been confirmed.

11. A computer-readable non-transitory information storage medium storing a program that causes a computer to implement a simulation, the program being a simulation control program that causes the computer to:
instruct a wearable image display device to display a virtual space;
detect a position in a real space of a user wearing the wearable image display device:
calculate a line of sight area of the user in the virtual space based on the detected position;
measure a gaze time of the user with respect to an object that is placed in the virtual space, based on a positional relationship between the line of sight area and the object;
determine that the object has been selected when the measured gaze time has reached a first threshold value;
determine that the selection has been confirmed when the measured value has reached a second threshold value that is larger than the first threshold value; and
notify the user of a magnitude of the measured value.

* * * * *